United States Patent [19]

Kajimoto et al.

[11] Patent Number: 5,347,625
[45] Date of Patent: Sep. 13, 1994

[54] DOCUMENT DISPLAY PROCESSING APPARATUS INCLUDING MEANS FOR CONTROLLING THE DISPLAY OF PLURAL TEXT BLOCK GROUPS

[75] Inventors: Kazuo Kajimoto, Neyagawa; Tomoyuki Nonomura, Osaka, both of Japan

[73] Assignee: Matsushita Electric Industrial Co., Ltd., Osaka, Japan

[21] Appl. No.: 748,189

[22] Filed: Aug. 20, 1991

[30] Foreign Application Priority Data

Aug. 24, 1990 [JP] Japan ................. 2-222764

[51] Int. Cl.$^5$ ............................................. G06F 15/62
[52] U.S. Cl. ......................................... 395/145; 395/144; 395/146; 364/419.1; 364/419.17; 364/225.6; 364/225.8; 364/225.9; 364/943.4; 364/943.43; 364/943.44; 364/943
[58] Field of Search ............... 395/145, 146, 144, 157, 395/147, 148; 364/419.1, 419.17, 225.6, 225.8, 943, 943.4, 943.43, 943.44, 225.9, 943.4

[56] References Cited

U.S. PATENT DOCUMENTS

| | | | |
|---|---|---|---|
| 4,713,754 | 12/1987 | Agarwal et al. | 364/200 |
| 4,723,211 | 2/1988 | Barker et al. | 364/300 |
| 4,829,294 | 5/1989 | Iwami et al. | 340/723 |
| 4,905,185 | 2/1990 | Sakai | 364/900 |
| 4,949,287 | 8/1990 | Yamaguchi et al. | 364/523 |
| 4,962,475 | 10/1990 | Hernandez et al. | 364/900 |
| 5,033,008 | 7/1991 | Barker et al. | 364/523 |
| 5,051,930 | 9/1991 | Kuwabara et al. | 364/523 |
| 5,067,070 | 11/1991 | Miyao et al. | 395/146 |
| 5,146,552 | 9/1992 | Cassorla et al. | 395/145 |
| 5,146,553 | 9/1992 | Noguchi et al. | 395/146 |
| 5,151,975 | 9/1992 | Shiraki et al. | 395/153 |
| 5,179,646 | 1/1993 | Kawakami et al. | 395/145 |
| 5,189,731 | 2/1993 | Sakamoto et al. | 395/146 |
| 5,197,122 | 3/1993 | Miyoshi et al. | 395/146 |
| 5,204,946 | 4/1993 | Shimamura | 395/146 |
| 5,214,755 | 5/1993 | Mason | 395/147 |

*Primary Examiner*—Gary V. Harkcom
*Assistant Examiner*—Joe Feild
*Attorney, Agent, or Firm*—Wenderoth, Lind & Ponack

[57] ABSTRACT

A coordinate input device is used in document processing to input user instructions including display coordinates of the display frame as specified by the user. A text block group control section controls a grouping of text to be displayed on the display frame, and includes a memory for storing a plurality of text characters, a block area storing section for storing information indicative of a plurality of rectangular display areas of the display frame each constituting a text block area, a text block specifying section for specifying text characters from among the plurality of text characters which are for display in each of plurality of rectangular display areas stored in the block area storing section, a text block display section for controlling the display of the text block areas stored in the block area storing section containing the text characters specified by the text block specifying section, and a text block group management section for designating a text block group containing one or more text block areas to be displayed by the text block display section. A display control section receives the user instructions from the coordinate input device and controls the text block group control section in accordance with the user instructions.

28 Claims, 22 Drawing Sheets

(this data includes elements of sentence and drawing.)  (problem is a positioning of these elements.)

(this data includes elements of sentence and drawing.)

(problem is a positioning of these elements.)

(this data consists of two sentence blocks.)

(this data consists of two sentence blocks.)

(this data consists of two sentence blocks.)

(this data consists of two sentence blocks.)

DOCUMENT DISPLAY PROCESSING APPARATUS INCLUDING MEANS FOR CONTROLLING THE DISPLAY OF PLURAL TEXT BLOCK GROUPS

BACKGROUND OF THE INVENTION

The present invention generally relates to a document processing apparatus which is capable of editing displayed documents composed of, for example, text and figures, using a personal computer or the like.

Accompanied by advances in hardware development, improvements in data processing of personal computers have been achieved including the display processing of documents composed of both text and figures.

FIG. 20 shows a block diagram of a conventional document processing apparatus.

In FIG. 20, reference numeral 2007 is a display frame (screen) which is the display area of a display device; reference numeral 2001 is a character code storing means A for storing as first text a first character code; reference numeral 2002 is a display area memory means A for storing coordinates of the display frame 2007 indicative of the location on the display frame 2007 at which the first character codes stored in the character code memory means A2001 are to be displayed; reference numeral 2003 is a sentence block display means A for effecting display, within the area of the display frame 2007 stored in the display area memory means A2002, of the first character code stored in the character code memory means A2001; reference numeral 2004 is a character code memory means B for storing as second text a second character code; reference numeral 2005 is a display area memory means B for storing coordinates of the display frame 2007 indicative of the location on the display frame 2007 at which the second character code stored on the character code memory means B2004 are to be displayed; reference numeral 2006 is a sentence block display means B for displaying, within the area of the display frame 2007 stored in the display area memory means B2002, the second character code stored in the character code memory means B2004; reference numeral 2008 is a displayed text block A of the first text; and reference numeral 2009 is a displayed text block B of the second text.

FIG. 21 depicts an example of a display frame associated with the conventional document processing apparatus. The operation of the apparatus of FIG. 20 will be described with reference to FIG. 21. The text shown by reference numeral 2101 is stored in the character code memory means A2001. When the coordinates 2102 are stored in the display area memory means A2002, the text 2101 is displayed at the coordinates 2102 of the display frame 2007 by the sentence block display means A2003.

Similarly, the text shown by reference numeral 2103 is stored in the character code memory means B2004. When the coordinates 2104 are stored in the display area memory means B2005, the text 2103 is displayed at the coordinates 2104 of the display frame 2007 by the sentence block display means B2006.

Reference numeral 2105 in FIG. 21 is a figure which is displayed simultaneously with the text 2101 and 2103, and reference numeral 2106 is a coordinate area in which the figure is displayed.

Such a system is called a "Sentence block system". Sentence blocks or text blocks are formed in which a rectangular area surrounds the sentence or text in the manner of a figure element. For example, Page Maker software by the Aldus company, which operates on the MACINTOSH personal computer of the Apple company, have adopted this system.

If the FIG. 2105 shown in FIG. 21 is moved downwards on the display frame 2007, an image on the display frame 2007 as shown in FIG. 22 will result.

The contents of the character code memory means 2001 and 2004 and the display area memory means 2002 and 2005 do not change when movement of the FIG. 2105 occurs. In FIG. 22, the content 2201 of the first text block conforms to the text 2101 of the FIG. 21, and the display coordinate position 2202 conforms to the display coordinate position 2102 of FIG. 21. Similarly, the content 2203 of the second text block conforms to the text 2103 of FIG. 21 and the display coordinate position 2203 conforms to the display coordinate position of 2103 of FIG. 21. Reference numeral 2205 in FIG. 22 is the moved figure, and reference numeral 2206 is a display coordinate area of the FIG. 2205.

As shown in FIG. 22, as a result of the movement of the FIG. 2205, the FIG. 2205 is superimposed on the text block 2204, thus resulting in an undesirable image.

As shown in FIG. 23, it is thus preferable that the text be moved and integrated to avoid the figure area when the figure area and the sentence blocks would otherwise be superimposed on each other through movement of the figure. FIG. 23 is a display frame image of an ideal example. Reference numeral 2301 is an integrated character code and reference numeral 2302 is an integrated text block. However, in the document processing apparatus using the conventional sentence block system, it is not possible to realize such a preferable operation.

In order to overcome this problem, a new document processing apparatus is developed. FIG. 24 shows a block diagram thereof. In FIG. 24, reference numeral 2408 is a display frame (screen) which is the image display area of a display device; reference numeral 2401 is a character code memory means for storing all the character codes; reference numeral 2402 is a line character number computing means A for computing the maximum number of text characters to be displayed on a first line on the display frame 2408; reference numeral 2403 is a character range specifying means A for specifying, based on the character number computed by the line character number computing means A2402, a character range to be extracted from the character code memory means 2401; reference numeral 2404 is a line display means A for displaying, on a first line of the picture frame 2408, the character range from the character code memory means 2401 specified by the character range specifying means A2402; reference numeral 2405 is a line character number computing means B for computing the maximum number of characters to be displayed on a second lime of the display frame 2408; reference numeral 2406 is a character range specifying means B for specifying, based on the character number computed by the line character number computing means B2405, a character range to be extracted from the character code memory means 2401 which is contiguous with the range specified by the character range specifying means A2403; reference numeral 2407 is a line displaying means B for displaying on the second line of the display frame 2408 the character range from the character code memory means 2401 specified by the character range specifying means B; reference numeral 2409 is a first line region of the display frame 2401; reference numeral 2410 is a text displayed in the first line region 2409; reference numeral 2411 is a second line region of the display frame 2401; and reference numeral 2411 is a text to be displayed in the second line region 2411. A line character number computing means, a character range specifying means and a line displaying means are provided for each line number of the display frame.

Such a system is called a "Sentence stream system" in which all the sentences or text are stored, as a series, in the character code storing means 2401, and a maximum number of characters are specified and extracted for display. The sentence stream system is used by, for example, the Guide software of the OWL company of England.

In the sentence stream system, in the case of FIG. 22, the display area except for the figure is automatically divided into line regions so as to compute the number of characters to be displayed in the respective line regions. FIG. 25 depicts a display frame example of the line division. Reference numeral 2501 is a figure and reference numeral 2502 is a display coordinate area of the FIG. 2501. Reference numerals 2503 through 2509 are first to seventh line regions of the display frame area excluding the display area 2502 of the FIG. 2501.

FIG. 26 shows a conceptional operation chart of the sentence stream system. In FIG. 26, reference numeral 2601 is a character code memory means for storing the text shown therein. Reference numeral 2602 is a line number; reference numeral 2603 is a maximum number of characters capable of display per line as computed by the line character number computing means 2402 and 2405 per each line; reference numeral 2604 is a start character position indicating for each line the overall character number of the character displayed at the initial line position from among the characters stored in the character code memory means in accordance with the maximum character number 2603; reference numeral 2605 is an end character position indicating for each line the overall character number of the character displayed at the last line position from among the characters stored in the character code memory means in accordance with the maximum character number 2603.

Since the first line accommodates ten characters at maximum, the first character through the tenth character of the character code storing means 2401 are accommodated in the first line. This character range is shown in reference numeral 2606.

Since the second line accommodates ten characters at maximum, the eleventh character through the twentieth character of the character code storing means 2401 are accommodated in the second line. This character range is shown in reference numeral 2607.

Since the third line accommodates ten characters at maximum, the twenty-first character through the thirtieth character of the character code storing means 2401 are accommodated in the third line. This character range is shown in reference numeral 2608.

Although the fourth line accommodates ten characters at maximum, only seven characters remain from among the characters stored in the character code memory means 2401, so that the thirty-first character through the thirty-seventh character are accommodated in the fourth line. This character range is shown in reference numeral 2609.

An example of the display frame resulting from the above process is shown in FIG. 27.

In FIG. 27, reference numeral 2701 is a figure; reference numeral 2702 is a display area of the FIG. 2701; reference numeral 2703 through reference numeral 2706 are the first through fourth line regions of the display frame; reference numeral 2707 through reference numeral 2710 are the text characters accommodated in the first through the fourth line regions. The display of FIG. 27 is the same as that of FIG. 23, and automatic arrangement of the text may be realized by the movement of the same figure.

However, when text such as an explanatory comment is attached to the figure, the sentence stream system is not suitable. FIG. 28 shows a display frame example of the sentence stream system when the comment "square" has been attached to the figure.

In FIG. 28, reference numeral 2801 is a figure; reference numeral 2802 is a display area of the FIG. 2801; reference numeral 2803 is a character code memory means; reference numeral 2804 is a text to be displayed on the first line from among the characters stored in the character code memory means 2803; reference numeral 2805 is a text to be displayed on the second line; reference numeral 2806 is the first line region of the display frame; reference numeral 2807 is the text displayed at the first line region 2806; reference numeral 2808 is the second line region of the display frame; and reference numeral 2809 is the text displayed at the second line region 2808.

In this case, although the characters to be displayed are three characters, the characters to be actually stored are sixteen. Also, the comment text cannot be moved within the display frame together with movement of the FIG. 2801.

However, in the sentence block system, if the coordinates of the display frame region of the movement destination are set in the display area storing means 2002 and 2005, it is possible to move the text comment.

In the sentence block system of FIG. 20, text cannot be set in a display frame region to avoid superimposing the text and the figure when the text and/or figure is moved, although text comments accompanying the figure can be moved with the figure. Conversely, in the sentence stream system of FIG. 24, text can be set in a display frame region to avoid superimposing the figure, but the text comments accompanying the figure cannot be moved with the figure.

SUMMARY OF THE INVENTION

Accordingly, the present invention has been developed with a view to substantially eliminating the above discussed drawbacks inherent in the prior art, and has for its essential object to provide an improved document processing apparatus.

Another important object of the present invention is to provide an improved document processing apparatus which makes it possible to integrate text into a display frame region to avoid superimposing the text on a figure, and to mover text comments accompanying the figure with movement of the figure.

In accomplishing these and other objects, according to one preferred embodiment of the present invention, there is provided a document processing apparatus which controls the display of text on a display frame of a display device, and which includes coordinate input means for inputting user instructions including display coordinates of the display frame as specified by the user; text block group control means for controlling a grouping of text to be display on said display frame, said text block group control means including (1) memory means for storing a plurality of text characters, (2) block area storing means for storing information indicative of a plurality of rectangular display areas of the display frame each constituting a text block area, (3) text block specifying means for specifying text characters from among the plurality of text characters which are for display in each of plurality of rectangular display areas stored in said block area storing means, (4) text block display means for controlling the display of the text block areas stored in said block area storing means containing the text characters specified by said text block specifying means, and (5) text block group management means for designating a text block group containing one or more text block areas to be displayed by said text block display means; display control means for receiving the user instructions from said coordinate input means and for controlling said text block group control means in accordance with the user instructions, said display control means including means for controlling a selection of text block areas to be displayed, a shifting of each text block group from one display location to another display location, a copying of a displayed text block group at another display location, a modification of a configuration of a displayed text block group, a grouping of text block areas to be contained in each text block group, a dissolving of text block groups into individual text blocks, and a transfer of text characters among different text block areas for display.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
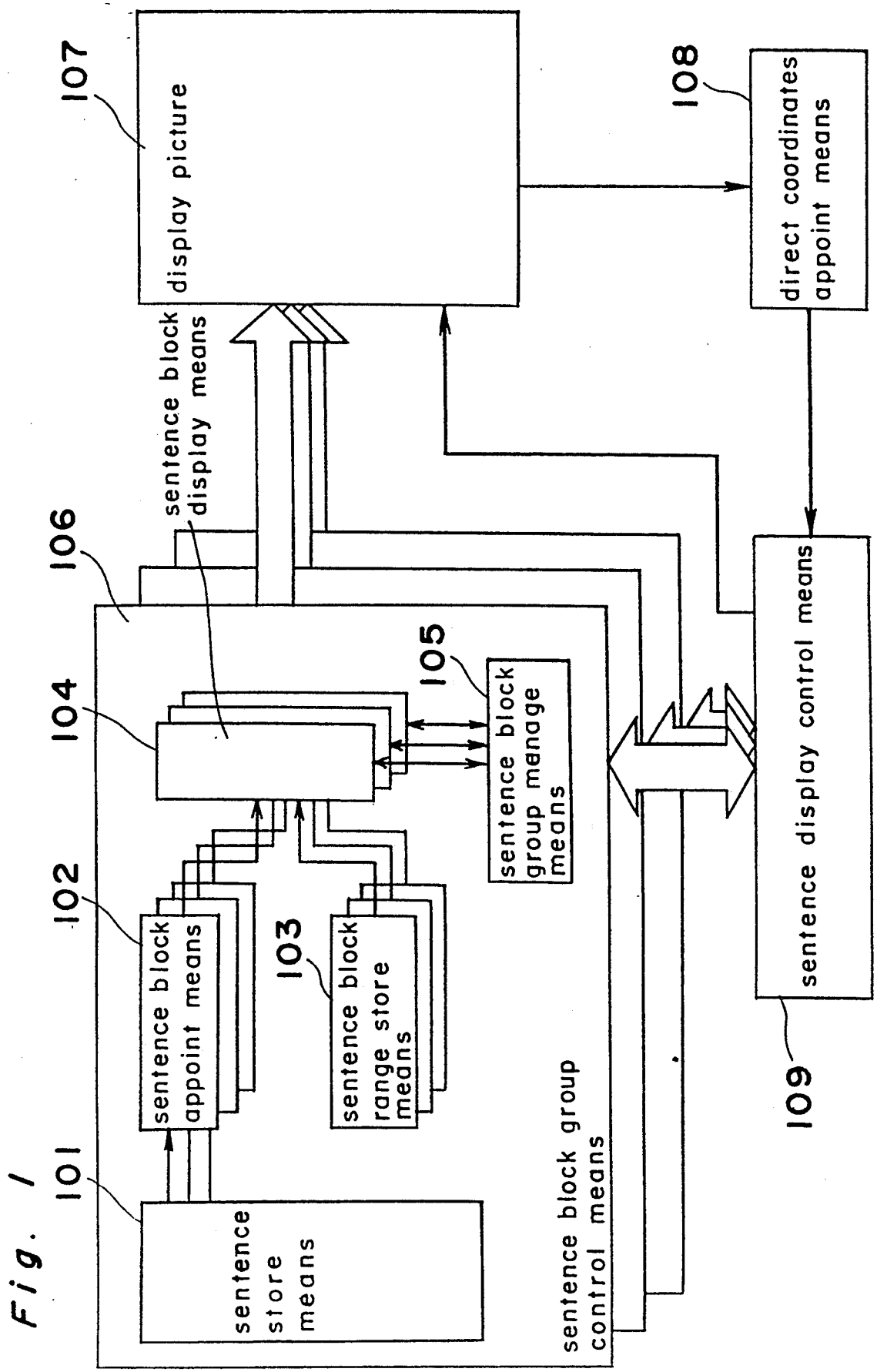
FIG. 1 is a schematic block diagram in one embodiment of the present invention.

Before the description of the present invention proceeds, it is to be noted that like parts are designated by like reference numerals throughout the accompanying drawings.

FIG. 1 is a schematic block diagram of a document processing apparatus in one embodiment of the present invention. In FIG. 1, reference numeral 101 is a sentence storing means for storing character codes; reference numeral 102 is a sentence block specifying means for specifying a character code to be displayed on individual sentence blocks, each sentence block constituting a rectangular display area on a display frame, from among the character codes stored by the sentence storing means 101; reference numeral 103 is a sentence block area storing means for storing display coordinate information of the rectangular area constituting an individual sentence block; reference numeral 104 is a sentence block displaying means for displaying the character code specified by the sentence block specifying means 102 in the rectangular display area stored in a corresponding sentence block area storing means 103; and reference numeral 105 is a sentence block group management means for storing a sentence block group information composed of one or more sentence blocks. The components of reference numeral 106 constitute a sentence block group control means which is provided for each of plural sentence block groups. Each block group control means 106 includes the storing means 101, the sentence block specifying means 102, the sentence block area storing means 103, the sentence block displaying means 104, and the sentence block group management 105. Reference numeral 107 is a display frame; reference numeral 108 is a direct coordinate specifying means which is capable of directly specifying display coordinates on the display frame 107; and reference numeral 109 is a sentence display control means for controlling the overall display operation of the apparatus.

Figure 2:
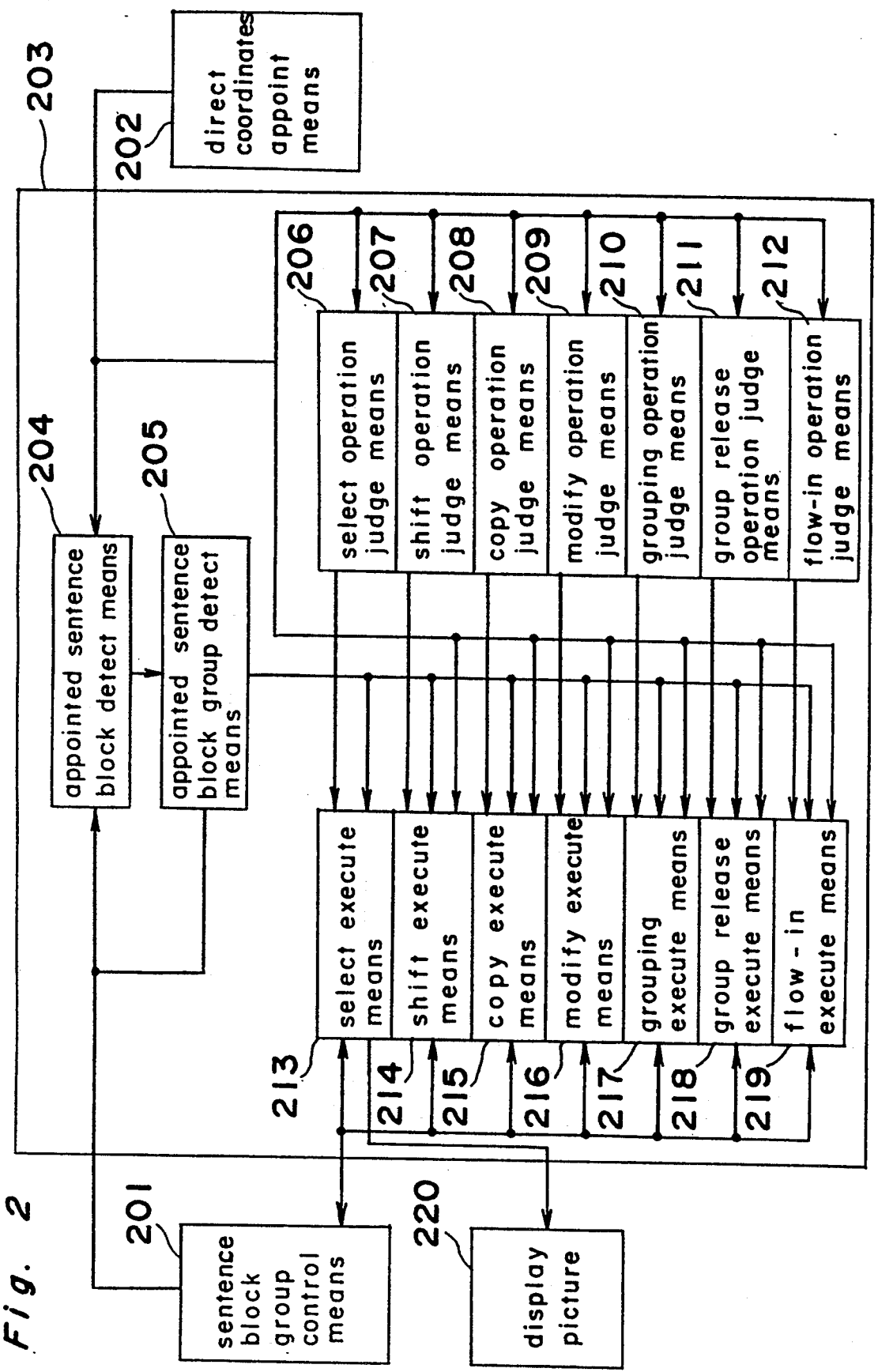
FIG. 2 is a detailed block diagram of a sentence display control means.

FIG. 2 is a detailed block diagram of the sentence display control means 109 of FIG. 1. In FIG. 2, reference numeral 201 is a sentence block group control means which is the same as the sentence block group control means 106 of FIG. 1; reference numeral 202 is a direct coordinate specifying means which is the same as the direct coordinate specifying means 108 of FIG. 1; reference numeral 203 is a sentence display control means which is the same as the sentence display control means 109 of FIG. 1; reference number 204 is a specified sentence block detecting means for detecting a sentence block (including the interior thereof) having coordinates specified by the direct coordinates specifying means 202; reference numeral 205 is a specified sentence block group detecting means for detecting a sentence block group including the sentence block detected by the specified sentence block detecting means 204; reference numeral 206 is a selecting operation judging means for judging that an operation specified by a user in an inputting operation via the direct coordinate specifying means 202 is a selecting operation; reference numeral 207 is a shift operation judging means for judging that an operation specified by a user in an inputting operation via the direct coordinate specifying means 202 is a shift operation; reference numeral 208 is a copy operation judging means for judging that an operation specified by a user is an inputting operation via the direct coordinates specifying means 202 is a copy operation; reference numeral 209 is a modify operation judging means for judging that an operation specified by a user in an inputting operation via the direct coordinates specifying means 202 is a modifying operation; reference numeral 210 is a grouping operation judging means for judging that an operation specified by a user in an inputting operation via the direction coordinates specifying means 202 is a grouping operation; reference numeral 211 is a group releasing opeation judging means for judging that an operation specified by a user in an inputting operation via the direct coordinates specifying means 202 is a group releasing operation; reference numeral 212 is a stream-in operation judging means for judging that an operation specified by a user in an inputting operation via the direct coordinates specifying means 202 is a stream-in operation; reference numeral 213 is a selecting operation executing means for executing a selecting operation when an operation specified by a user has been judged to be a selecting operation by the selecting operation judging means 206; reference numeral 214 is a moving operation executing means for executing a shift operation when an operation specified by a user has been judged to be a shift operation by the shift operation judging means 207; reference numeral 215 is a copy operation executing means for executing a copy operation when an operation specified by a user has been judged to be a copy operation by the copy operation judging means 208; reference numeral 216 is a modifying operation executing means for executing a modify operation when an operation specified by a user has been judged to be a modify operation by the modify operation judging means 209; reference numeral 217 is a grouping operation executing means for executing a grouping operation when an operation specified by a user has been judged to be a grouping operation by the grouping operation judging means 210; reference numeral 218 is a group releasing operation executing means for executing a group releasing operation when an operation specified by a user has been judged to be a group releasing operation by the group releasing operation judging means 211; reference numeral 219 is a stream-in operation executing means for executing a stream-in operation when an operation specified by a user has been judged to be a stream-in operation by the stream-in operation judging means 212; and reference numeral 220 is a display frame which is the same as the reference numeral 107 of FIG. 1.

Figure 3:
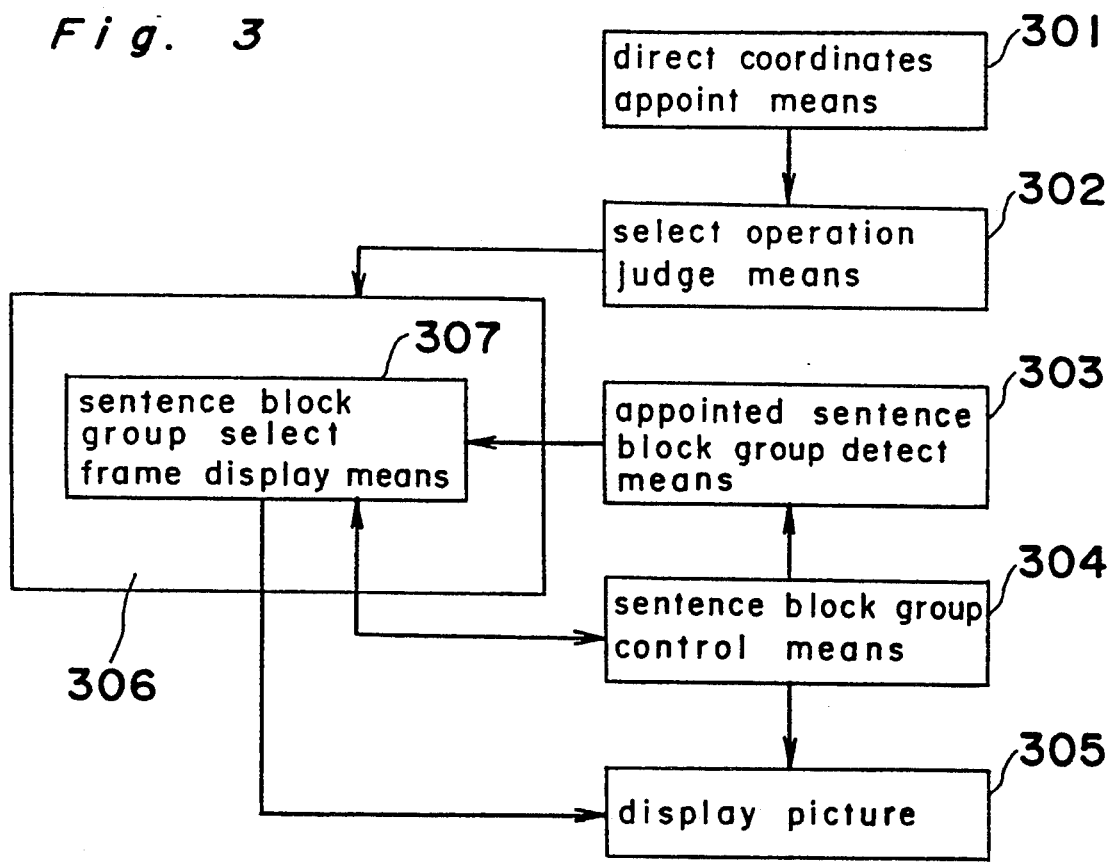
FIG. 3 is a detailed block diagram of a selection executing means.

FIG. 3 is a detailed block diagram of a selecting operation executing means 213 of FIG. 2. In FIG. 3, reference numeral 301 is a direct coordinates specifying means which is the same as the reference numeral 202 of FIG. 2; reference numeral 302 is a selecting operation judging means which is the same as the reference numeral 206 of FIG. 2; reference numeral 303 is a specified sentence block group judging means which is the same as the reference numeral 205 of FIG. 2; reference numeral 304 is a sentence block group control means which is the same as the reference numeral 201 of FIG. 2; reference numeral 305 is a picture frame which is the same as the reference numeral 220 of FIG. 2; reference numeral 306 is a selecting operation executing means which is the same as the reference numeral 213 of FIG. 2; and reference numeral 307 is a sentence block group selecting frame displaying means for displaying, when the operation of the user has been judged to be a selecting operation by the selecting operation judging means 302, a selecting frame in a polygon display area which includes all the rectangular areas stored in the sentence block area storing means corresponding to all the sentence blocks to be stored by the sentence block group management means 105 corresponding to the sentence block group detected by the specified sentence block group detecting means 303.

Figure 4:
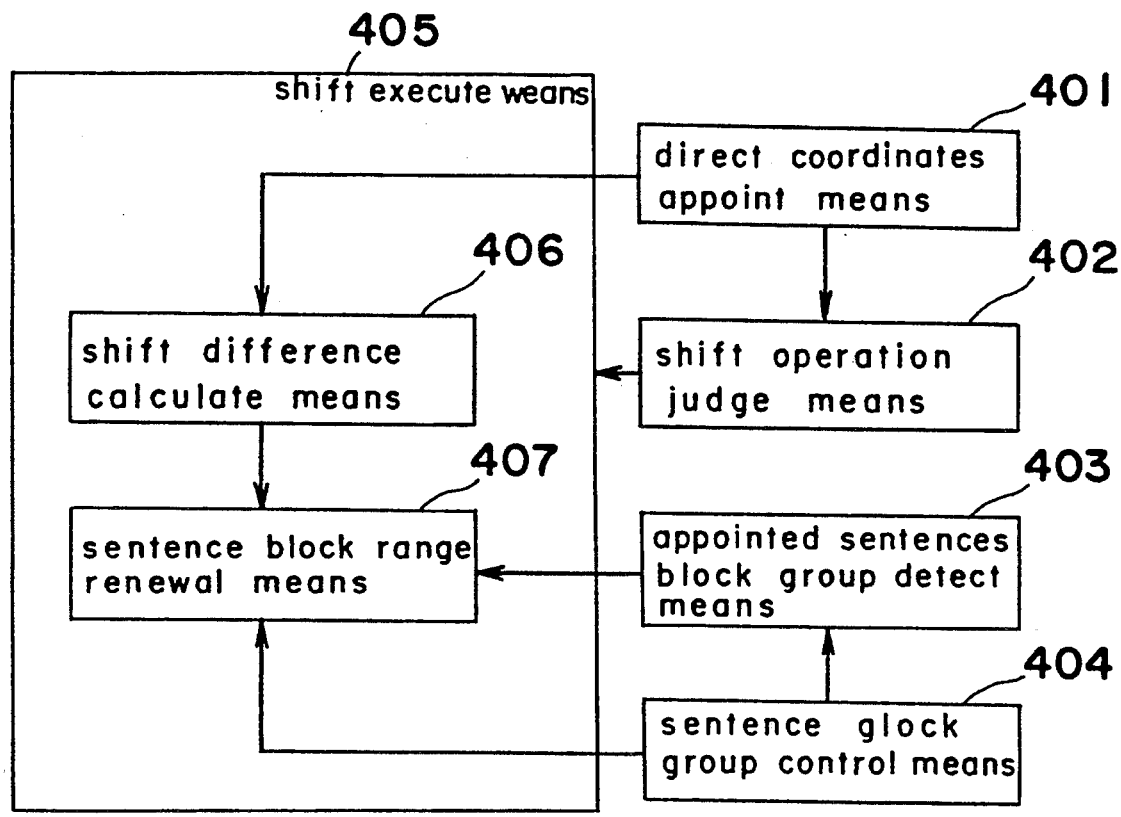
FIG. 4 is a detailed block diagram of a shift executing means.

FIG. 4 is a detailed block diagram of a moving operation executing means 214 of FIG. 2. In FIG. 4, reference numeral 401 is a direct coordinates specifying means which is the same as the reference numeral 202 of FIG. 2; reference numeral 402 is a moving operation judging means which is the same as the reference numeral 207 of FIG. 2; reference numeral 403 is a specified sentence block group judging means which is the same as the reference numeral 205 of FIG. 2; reference numeral 404 is a sentence block group control means which is the same as the reference numeral 201 o[FIG. 2; reference numeral 405 is a moving operation executing means which is the same as the reference numeral 214 of FIG. 2; reference numeral 406 is a movement difference portion computing means for obtaining the coordinates of a movement origin and the coordinates of a movement destination according to inputs from the direct coordinate specifying means 401 so as to compute the difference portion therebetween; and reference numeral 407 is a sentence block area renewing means for adding the difference portion computed by the movement difference portion computing means 406 to the rectangular area stored in the sentence block area storing means 103, corresponding to all the sentence blocks to be stored by the sentence block group management means 105 corresponding to the sentence block group detected by the specified sentence block group detecting means 403, so as to determine the coordinates of a new rectangular area of the sentence block.

Figure 5:
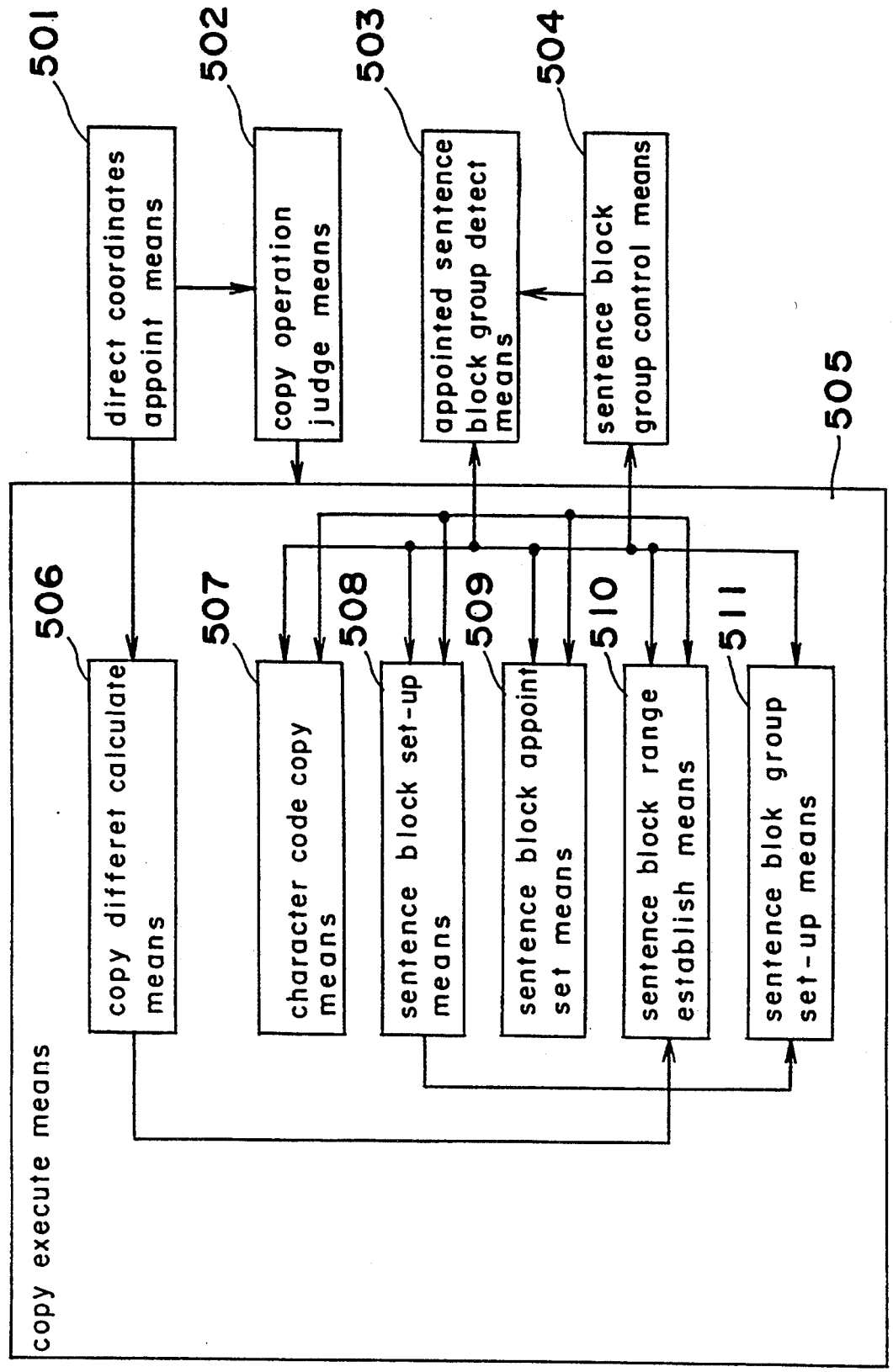
FIG. 5 is a detailed block diagram of a copy executing means.

FIG. 5 is a detailed block diagram of a copy operation executing means 215 of FIG. 2. In FIG. 5, reference numeral 501 is a direct coordinate specifying means which is the same as the reference numeral 202 of FIG. 2; reference numeral 502 is a copy operation judging means which is the same as the reference numeral 208 of FIG. 2; reference numeral 503 is a specified sentence block group judging means which is the same as the reference numeral 205 of FIG. 2; reference numeral 504 is a sentence block group control means which is the same as the reference numeral 201 of FIG. 2; reference numeral 505 is a copy operation executing means which is the same as in the reference numeral 215 of FIG. 2; reference numeral 506 is a duplicating difference portion computing means for obtaining the coordinates of a copy origin and the coordinates of a copy destination according to inputs from the direct coordinates specifying means 501 so as to compute a difference portion therebetween; reference numeral 507 is a character code copy means for copying the character code in the sentence storing means 101 referred to by the sentence block specifying means 102 corresponding to all the sentence blocks, to be stored by the sentence block group management means 105 corresponding to the sentence block group detected by the specified sentence block group detected by the specified sentence block group detecting means 503; reference numeral 508 is a sentence block set-up means for newly forming a sentence block specifying means 102 which is equal in number to the sentence block specifying means 102, a sentence block area storing means 103, a sentence block displaying means 104; reference numeral 509 is a sentence block specification setting means for setting the same contents therein as the character code specified by the original sentence block specifying means 102 in a character code with the contents of the sentence block specifying means 102 newly established by the above described sentence block newly-establishing means 508 being duplicated by the above described character code duplicating means 507; reference numeral 510 is a sentence block area setting means for making the contents of the sentence block area storing means 103, established newly by the sentence block newly-establishing means 508, the coordinates of the new rectangular area with the difference portion of the coordinates computed by the duplicating different portion computing means 506 being added into a rectangular area stored in the formed sentence block area storing means 103; reference numeral 511 is a sentence block group newly-establishing means for newly establishing the sentence block group executing means 105 with the sentence block newly established by the above described sentence block newly-establishing means 508 being made the element thereof.

Figure 6:
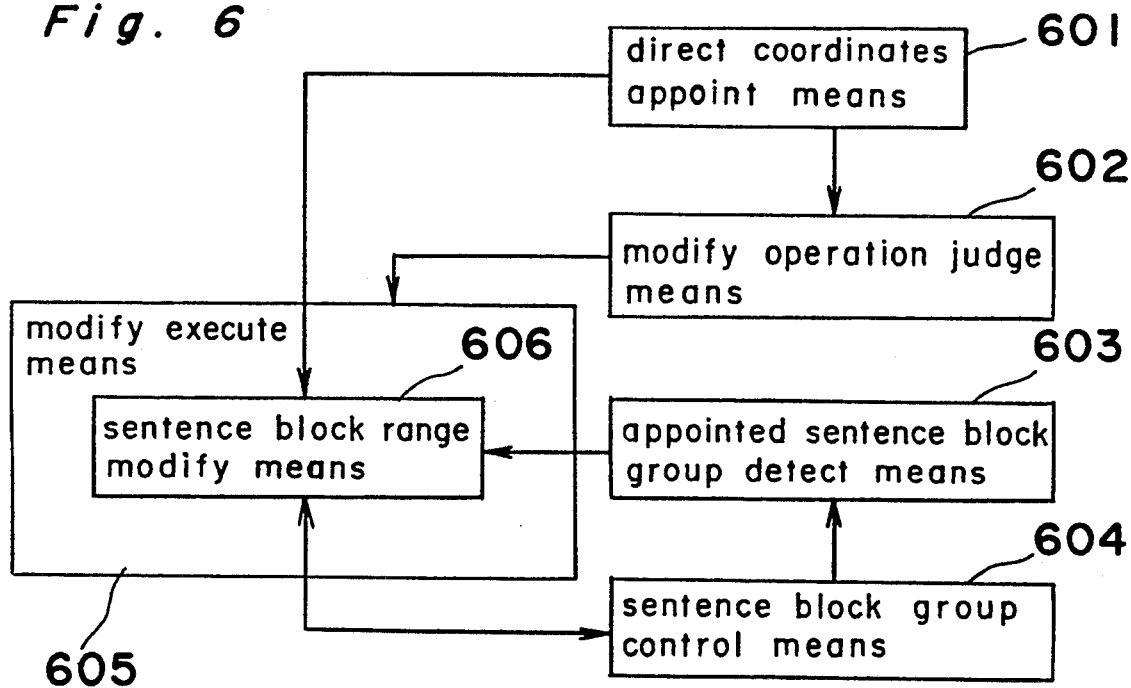
FIG. 6 is a detailed block diagram of a modify executing means.

FIG. 6 is a detailed block diagram of a modify operation executing means 216 of FIG. 2. In FIG. 6, reference numeral 601 is a direct coordinates specifying means which is the same as the reference numeral 202 of FIG. 2; reference numeral 602 is a modify operation judging means which is the same as the reference numeral 209 of FIG. 2; reference numeral 603 is a specified sentence block group judging means which is the same as the reference numeral 205 of FIG. 2; reference numeral 604 is a sentence block group control means which is the same as the reference numeral 201 of FIG. 2; reference numeral 605 is a modify operation executing means which is the same as the reference numeral 216 of FIG. 2; and reference numeral 606 is a sentence block area modifying means for substituting into the rectangular area to be obtained as the results of the modifying operation, the rectangular area stored in the sentence block area storing means 103 corresponding to the sentence block detected by the specified sentence block detecting means 603.

Figure 7:
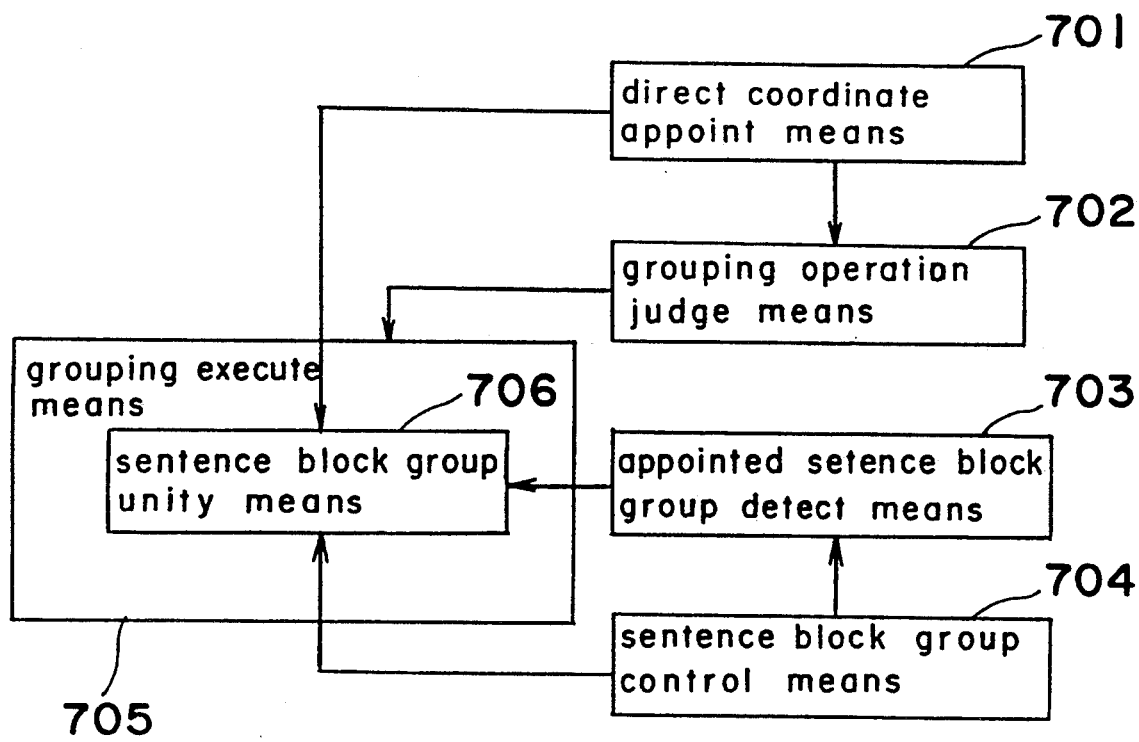
FIG. 7 is a detailed block diagram of a grouping executing means.

FIG. 7 is a detailed block diagram of a grouping operation executing means 217 of FIG. 2 In FIG. 7, reference numeral 701 is a direct coordinates specifying means which is the same as the reference numeral 202 of FIG. 2; reference numeral 702 is a grouping operation judging means which is the same as the reference numeral 210 of FIG. 2; reference numeral 703 is a specified sentence block group judging means which is the same as the reference numeral 205 of FIG. 2; reference numeral 704 is a sentence block group control means which is the same as the reference numeral 201 of FIG. 2; reference numeral 705 is a grouping operation executing means which is the same as the reference numeral 217 of FIG. 2; reference numeral 706 is a sentence block group integrating means for newly forming the sentence block group management means 105 having, as the elements thereof, all the sentence block to be controlled by the sentence block group management means 105 corresponding to all the sentence block groups with the selection frame being displayed, removing all the original sentence block group management means 105.

Figure 8:
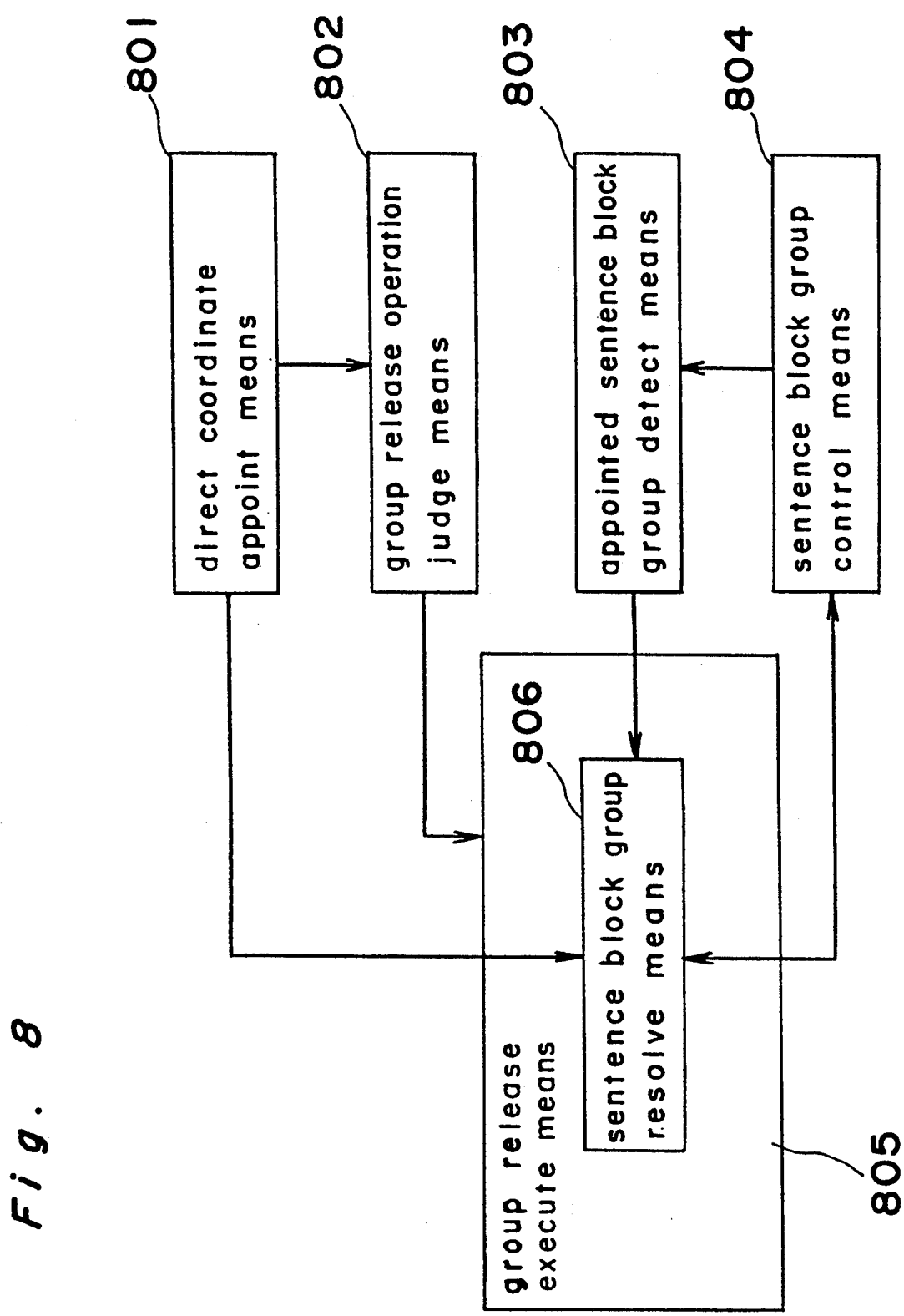
FIG. 8 is a detailed block diagram of a group release executing means.

FIG. 8 is a detailed block diagram of the group releasing operation executing means 218 of FIG. 2. In FIG. 8, reference numeral 801 is a direct coordinates specifying means which is the same as the reference numeral 202 of FIG. 2; reference numeral 802 is a group releasing operation judging means which is the same as the reference numeral 211 of FIG. 2; reference numeral 803 is a specified sentence block group judging means which is the same as the reference numeral 205 of FIG. 2; reference numeral 804 is a sentence block group control means which is the same as in the reference numeral 201 of FIG. 2; reference numeral 805 is a group releasing operation executing means which is the same as in the reference numeral 218 of FIG. 2; reference numeral 806 is a sentence block group means for newly establishing the sentence block group executing means 105 having, as only one element thereof, the sentence block about all the sentence blocks to be controlled by the sentence block group executing means 105 corresponding to all the sentence block group, with the selection frame being displayed, removing the original sentence block group executing means 105.

Figure 9:
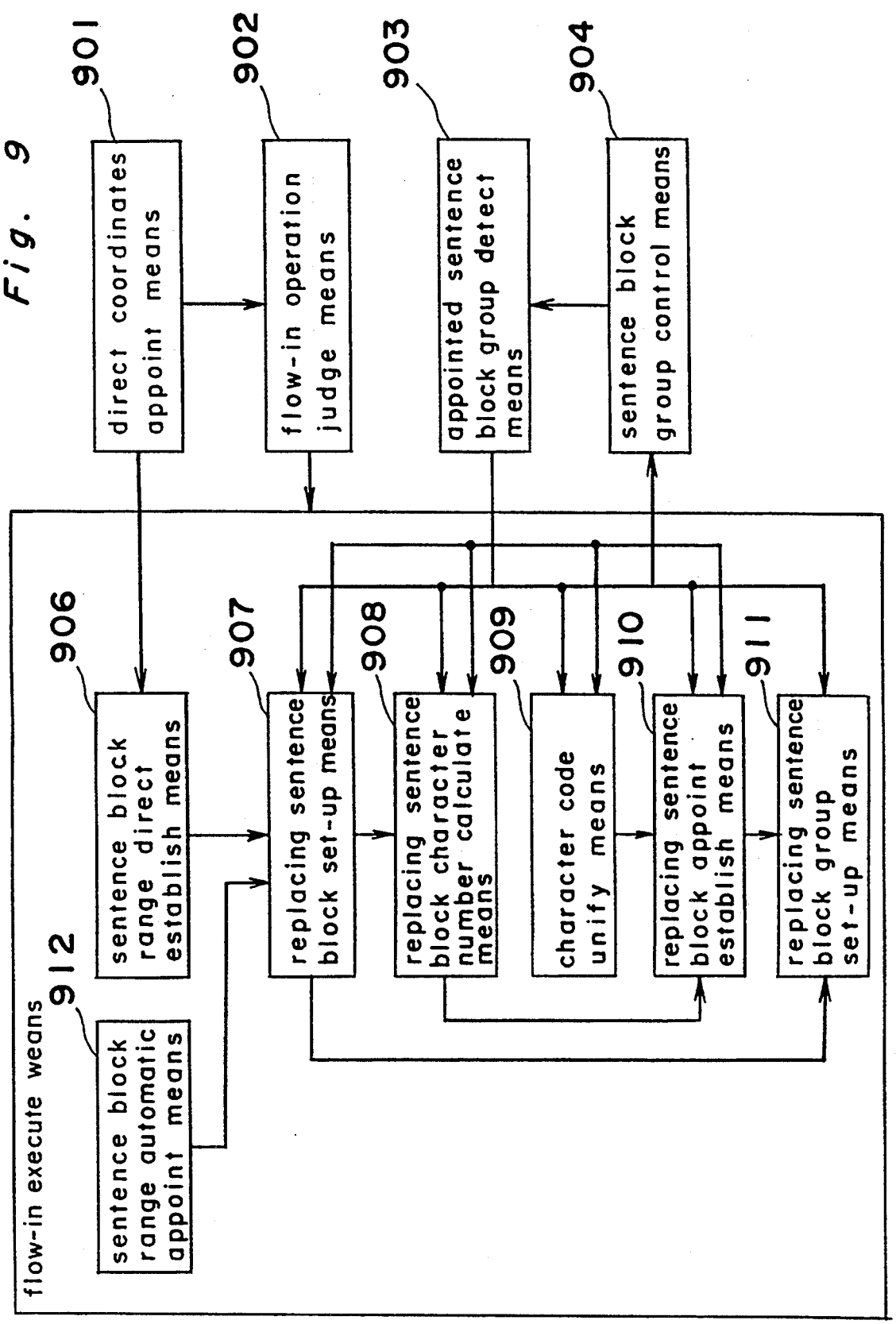
FIG. 9 is a detailed block diagram of a stream-in executing means.

FIG. 9 is a detailed block diagram of a stream-in operation executing means 219 of FIG. 2. In FIG. 9, reference numeral 901 is a direct coordinates specifying means which is the same as the reference numeral 202 of FIG. 2; reference numeral 902 is a stream-in operation judging means which is the same as the reference numeral 212 of FIG. 2; reference numeral 903 is a specified sentence block group judging means which is the same as the reference numeral 205 of FIG. 2; reference numeral 904 is a sentence block group control means which is the same as the reference numeral 201 of FIG. 2; reference numeral 905 is a stream-in operation executing means which is the same as the reference numeral 219 of FIG. 2; reference numeral 906 is a sentence block area direct specifying means for specifying a sentence block rectangular area with the use of the direct coordinates specifying means 901; reference numeral 907 is a replacing sentence block set-up means for newly establishing the sentence block specifying means 102, the sentence block area storing means 103, and the sentence block displaying means 104, each time the sentence block is established by the sentence block area direct specifying means 906, and setting the rectangular area specified by the sentence block area direct specifying means 906 on the newly established sentence block area storing means 103; reference numeral 908 is a replacing sentence block character number computing means for computing the number of character codes to be included from the size of the sentence block rectangular area specified by the sentence block area direct specifying means 9(30; reference numeral 909 is a write character code integrating means for integrating a series of all the character codes specified by the sentence block specifying means 102, with respect to all the sentence blocks, controlled by the sentence block group management means 105 with respect to all the sentence block groups with the selection frames being displayed when the operation of the user has been judged to be the stream-in operation by the stream in operation judging means 902 after one sentence block or more has been newly established by the replacing sentence block set-up means 907; reference numeral 910 is a replacing sentence block specification setting means for each character number by the alternate sentence block character number computing means 908 from the continued portion of the character codes in a sentence storing means 101 integrated by the character code integrating means 909 so as to set it on the sentence block specifying means 102 newly established by the corresponding alternate sentence block newly-establishing means 907; reference numeral 911 is a replacing sentence block group set-up means for newly forming the sentence block group management means 105 having, as elements, all the sentence blocks newly established by the replacing sentence block set-up means 907 so as to remove all the former sentence block group management means 105; and reference numeral 912 is a sentence block area automatic specifying means for automatically specifying the rectangular area as the sentence block on the display frame.

The operation of the document processing apparatus of the present embodiment will be described below.

Text in the form of character codes is stored in the sentence storing means 101. The character code specified by the sentence block specifying means 102 is to be displayed by the sentence block displaying means 104 within the rectangular display area of the respective sentence block stored in the sentence block area storing means 103. Initially, an operation is specified by the user using the direct coordinates specifying means 108.

The specified operation is transmitted to the selecting operation judging means 206, the shift operation judging means 207, the copying operation judging means 208, the modifying operation judging means 209, the grouping operation judging means 210, the group releasing operation judging means 211, and the stream-in operation judging means 212.

When the selecting operation judging means 206 judges that the user specified operation is a selecting operation, the selection executing means 213 is executed.

Figure 10:
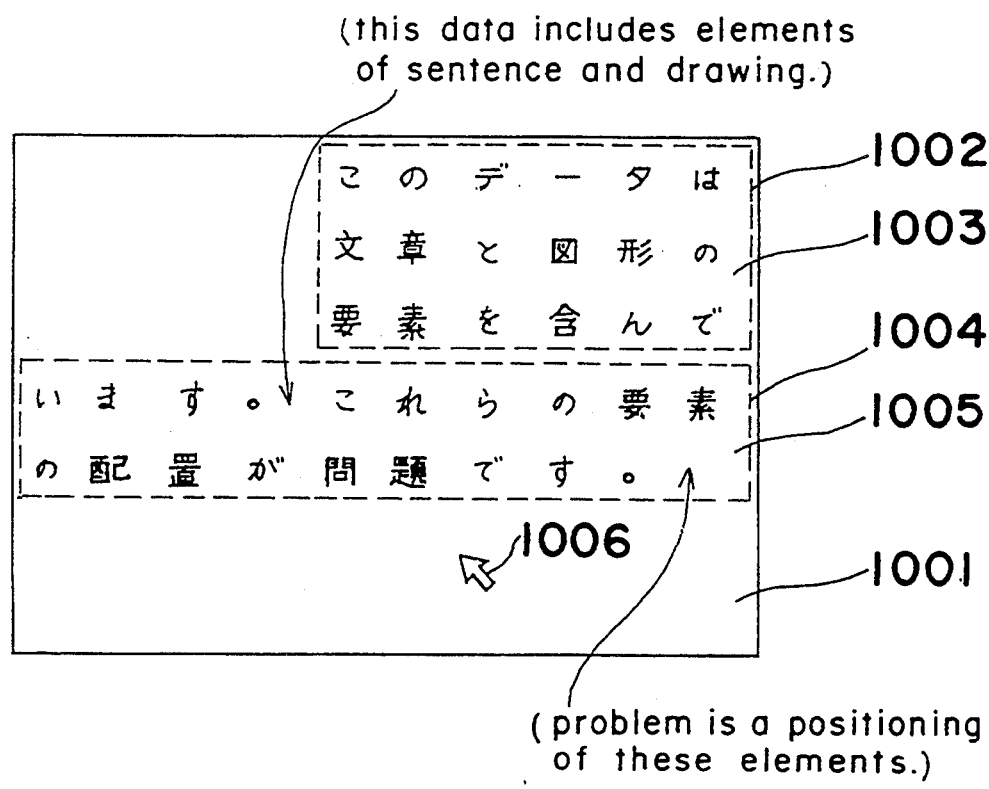
FIG. 10 is a selecting operation display frame example.
Figure 10:
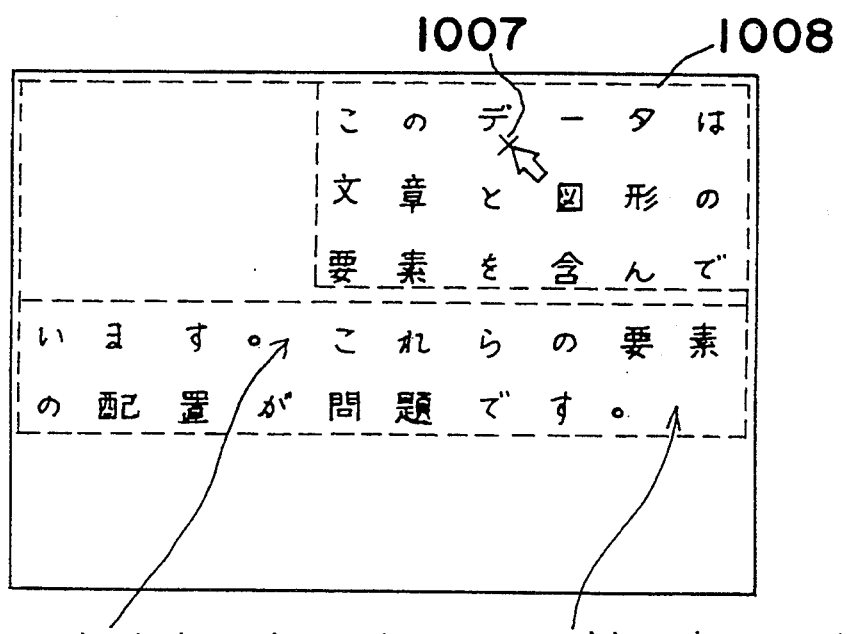

FIG. 10 is a display frame example for explaining the selecting operation. Reference numeral 1001 is a display frame; reference numeral 1002 is a first sentence block; reference numeral 1003 denotes character codes displayed in the first sentence block 1002; reference numeral 1004 is a second sentence block; reference numeral 1005 denotes character codes displayed in the second sentence block 1004; and reference numeral 1006 is a pointer displayed on the display frame 1001 by the direct coordinates specifying means 301.

In the selection executing means 213, referring also to FIG. 3, the following operations are executed. Using the pointer 1006, the user selects a selection point 1007 on the display frame 1001. The specified sentence block detecting means 204 detects which of the displayed blocks contains the coordinates of the selection point 1007 specified by the user using the direct coordinates specifying means 301. This detection is carried out by comparing the coordinates of the selection point 1007 with the coordinates of each rectangular display area stored in the sentence block area storing means 103. In the case of FIG. 10, the first sentence block 1002 is detected.

Then, the specified sentence block group detecting means 303 detects a sentence bloc]<group which includes the sentence block detected by the specified sentence block detecting means 204. This is done by examining each of the sentence block groups stored in the sentence block group management means 105. In the case of FIG. 10, the sentence block group containing the sentence block 1002 is detected. Then, the selected sentence block group frame displaying means 307 displays corresponding selected text by displaying a selected sentence block group frame in a polygon display region which includes all of the rectangular display areas stored in the sentence block area storing means 103 corresponding to the sentence blocks of the detected sentence block group as stored in the sentence block group management means 105. In the case of FIG. 10, since the second sentence block 1004 is contained in the same sentence block group as is the sentence block 1002, the selected sentence block group frame shown by reference numeral 1008 is displayed in polygon region including both the sentence blocks 1002 and 1004. In this manner, the user is informed that selection of the sentence block group has been executed.

Figure 11:
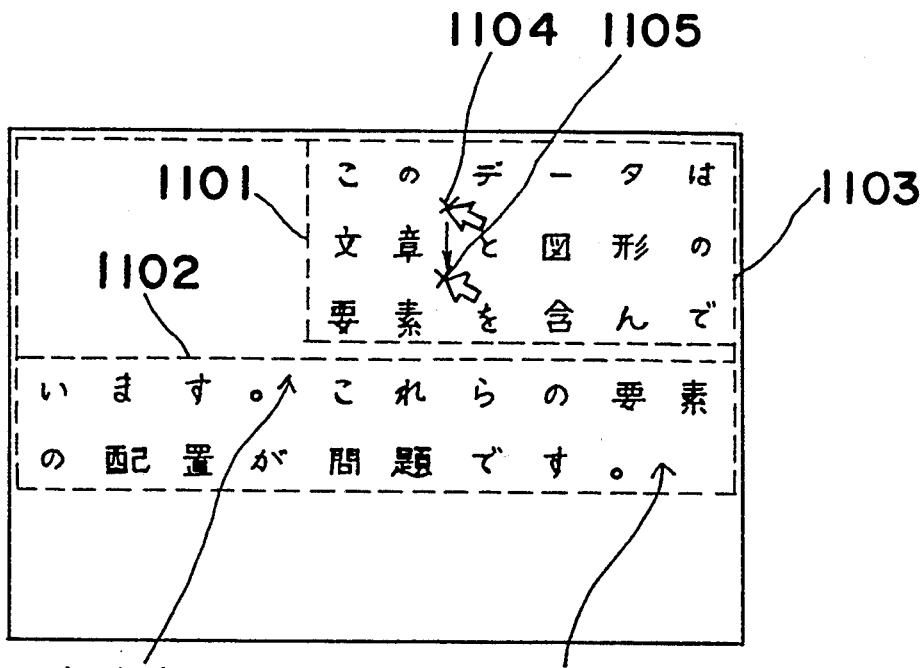
FIG. 11 is a shifting operation display frame example.
Figure 11:
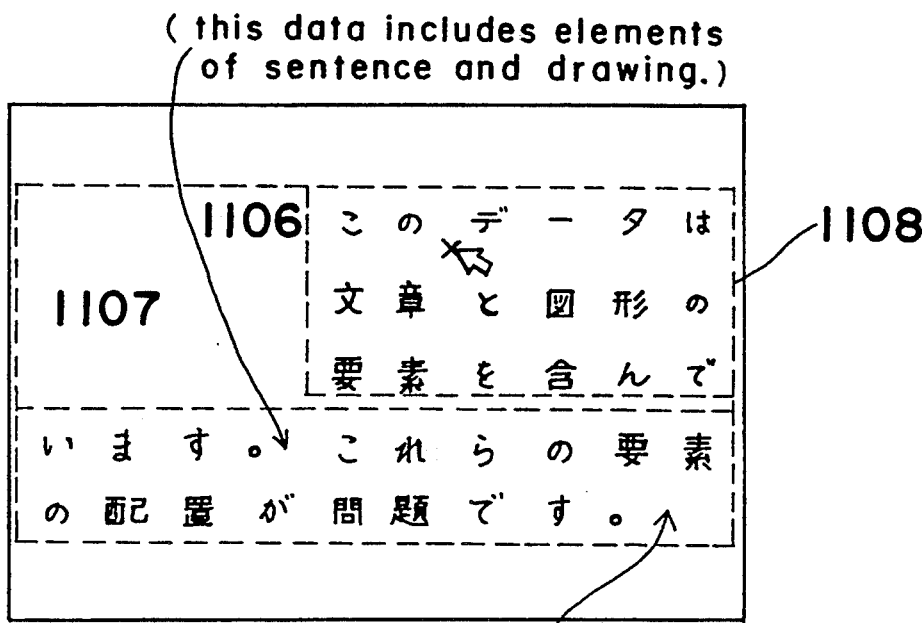

When the user instructs that text displayed on the display frames to be moved, the shift operation judging means 207 determines that the operation to be executed is a shifting operation. When the user specified operation is judged to be a shifting operation, the shift executing means 214 is processed. FIG. 11 is a display frame example for explaining the shifting operation. Reference numeral 1101 is a first sentence block; reference numeral 1102 is a second sentence block; and reference numeral 1103 is a selected sentence block group frame surrounding the sentence blocks 1101 and 1102. Referring also to FIG. 4, in the shift executing means 214, the following operation is executed. According to the inputs of the direct coordinates specifying means 401, the shift distance computing means 406 obtains the coordinates of a shift origin and the coordinates of a shift destination so as to compute a coordinate difference therebetween. In FIG. 11, by the movement of the pointer from the shift origin point 1104 to the shift destination point 1105, the coordinate difference therebetween is computed.

The sentence block area renewing means 407 adds the computed coordinate difference to each rectangular area stored in the sentence block area storing means 103 which correspond to the sentence blocks contained in the sentence block group stored in the sentence block group management means 105 as detected by the specified sentence block group detecting means 403. In this manner, coordinates of new rectangular areas of the sentence blocks are defined. In FIG. 11, since sentence blocks 1101 and 1102 belong to the same sentence block group, the coordinate difference is added to the rectangular areas of both the sentence blocks 1101 and 1102. Thus, the sentence block 1101 is moved to the position of the sentence block 1106, and the sentence block 1102 is moved into the position of the sentence block 1107. The selected sentence block group frame is then moved into the position 1108 surrounding the sentence blocks 1106 and 1107.

Figure 12:
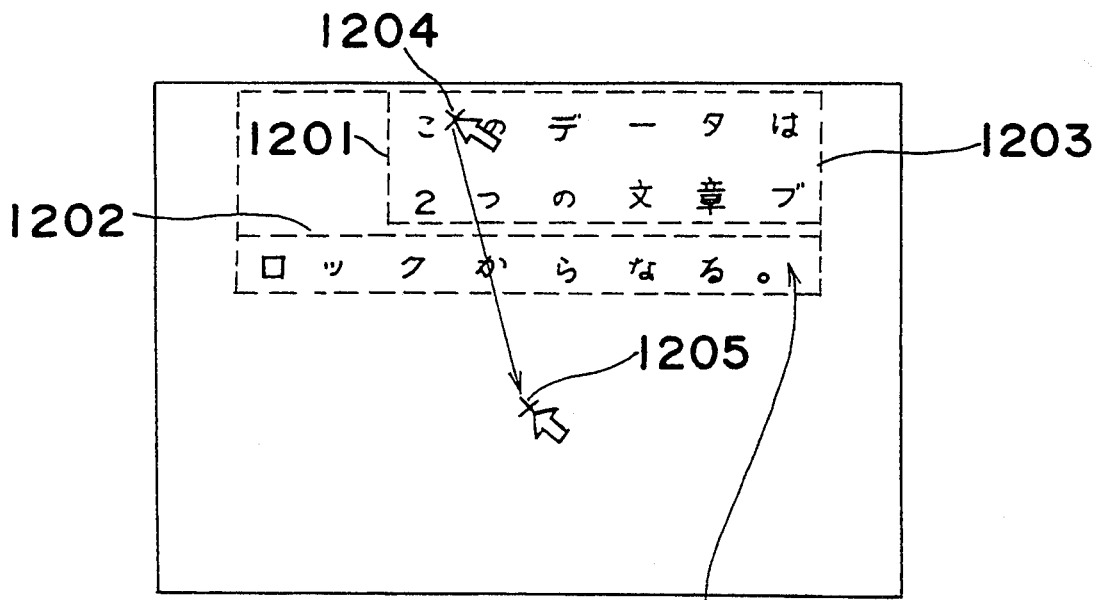
FIG. 12 is a copying display frame example.
Figure 12:
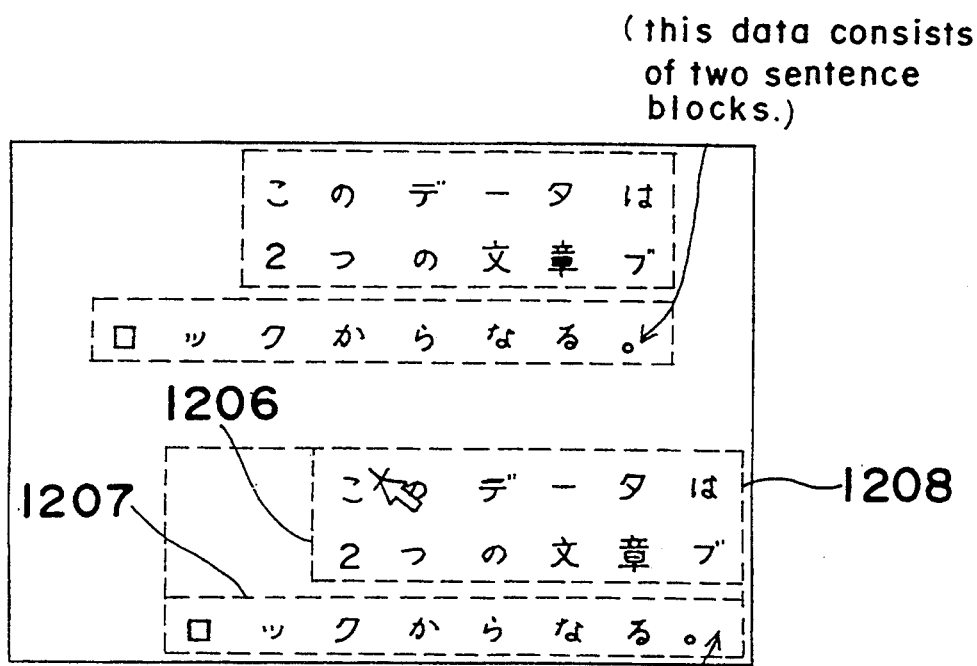

When the user instructs that text displayed on the display frame is to be copied, the copy operation judging means 208 determines that the user specified operation is a copy operation. When the user specified operation is judged to be the copy operation, the copy executing means 215 is processed. FIG. 12 is a display frame example for explaining the copy operation. Reference numeral 1201 is a first sentence block; reference numeral 1202 is a second sentence block; and reference numeral 1203 is a selected sentence block group frame surrounding the sentence blocks 1201 and 1202.

Referring also to FIG. 5, in the copy executing means 215, the following operation is executed. According to the inputs of the direct coordinates specifying means 501, the copy distance portion computing means 506 obtains the coordinates of a copy origin and the coordinates of a copy destination so as to compute a coordinate difference therebetween. In FIG. 12, the distance from the copy origin point 1204 to the copy destination point 1205 is computed as the coordinate difference.

The character code copy means 507 copies the character codes stored in the sentence storing means by referring to the sentence block specifying means 102 containing the sentence blocks corresponding to the sentence block group stored by the sentence block group management means 105 as detected by the specified sentence block group detecting means 503. In the case of FIG. 12, the character codes of the original blocks are copied. The sentence block forming means 508 establishes a sentence block specifying means 102 equal in number to the selected sentence blocks, a sentence block area storing means 103, and a sentence block displaying means 104. In the case of FIG. 12, two sentence blocks are newly established.

The sentence block specification setting means 509 sets the contents of the sentence block specifying means 102 which have been newly established by the sentence block forming means into the same contents as those of the character codes to be specified by the original sentence block specifying means 102 in the character codes copied by the character code copying means. The sentence block area setting means 510 causes the contents of the sentence block area storing means 103 newly established by the sentence block newly-establishing means 508 to become the coordinates of the new rectangular area with the coordinate difference computed by the copy difference portion computing means 506 being added into the rectangular area stored in the original sentence block area storing means 103. In FIG. 12, the first new sentence block is set in the display area 1206, and the second is set in the display area 1207.

Finally, the sentence block group management means 105 is provided with a new sentence block group containing the sentence blocks newly formed by the sentence block forming means 508 by the sentence block group forming means 511. As a result, in FIG. 12, a selected sentence block group frame is displayed in an area 1208 surrounding the sentence block areas 1206 and 1207.

When the user instructs that a configuration of a sentence block displayed on tile display frame be modified, the modify operation judging means 209 judges that the user specified operation is a modify operation.

Figure 13:
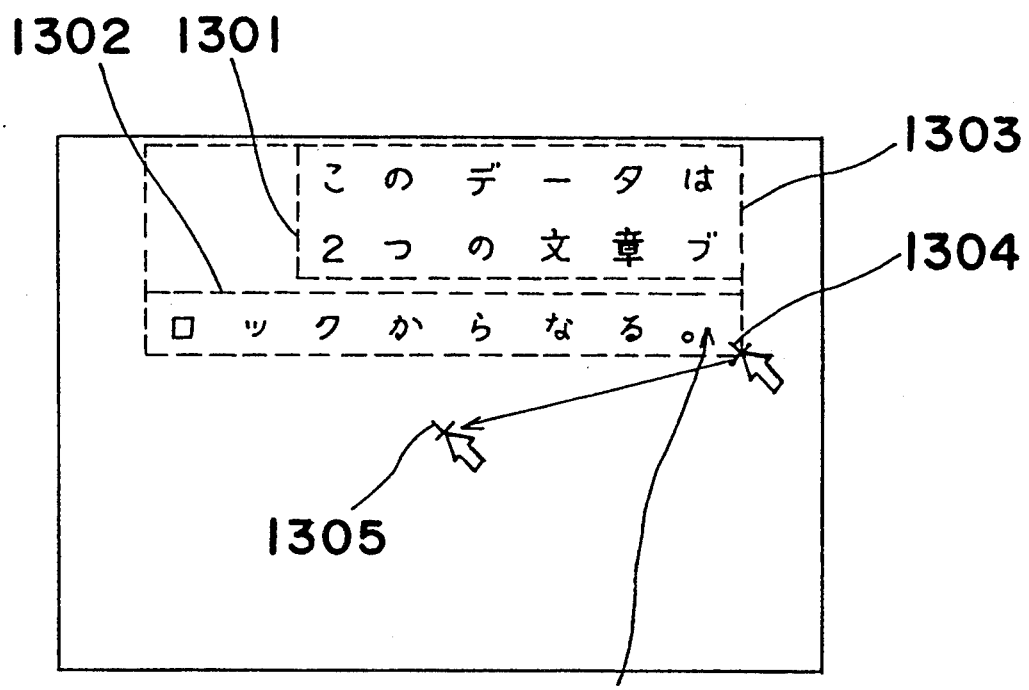
FIG. 13 is a modifying operation display frame example.
Figure 13:
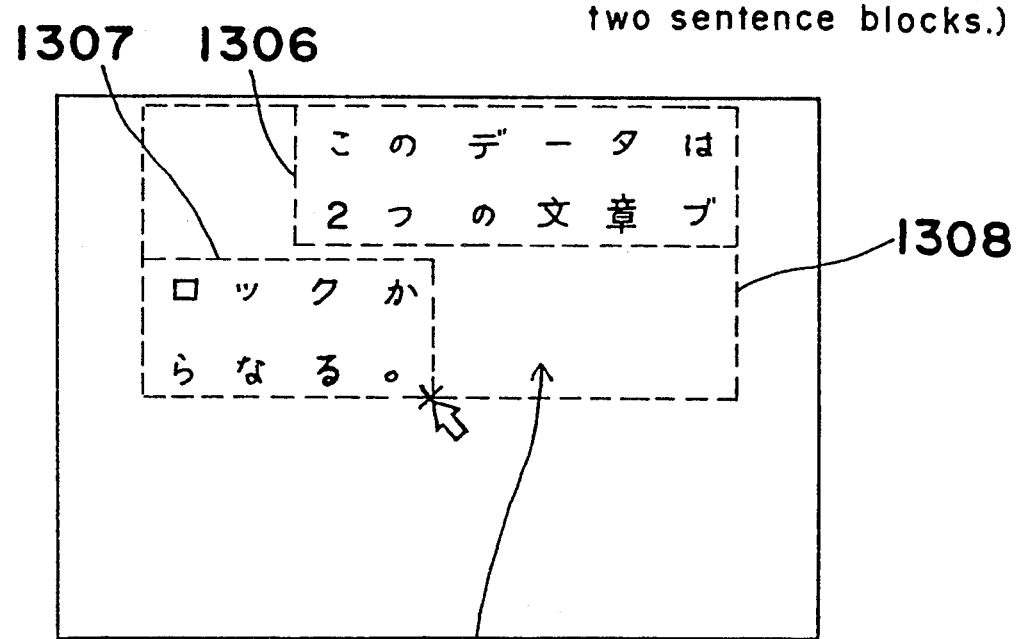

When the user specified operation is judged to be the modify operation, the executing means 216 is executed. FIG. 13 is a display frame example for explaining the modify operation. Reference numeral 1301 is a first sentence block; reference numeral 1302 is a second sentence block; and reference numeral 1303 is a selected sentence block group frame surrounding the sentence blocks 1301 and 1302.

Referring also to FIG. 6, in modify executing means 216, the following operation is executed.

The sentence block area modify means 606 realizes the modify operation of the sentence block by substitution, into a rectangular area to be obtained as a result of the modify operation, of rectangular area stored into the sentence block area storing means 103 corresponding to the sentence block detected by the specified sentence block detecting means 603. In the case of FIG. 13, when modification of the modify origin point 1304 to the modify target point 1305 is specified, the display area of the sentence block 1302 is set into the rectangular area 1307 defined by the modify target point 1305. The display area of the sentence block 1301 does not change as shown by reference numeral 1306. As a result of the modification, the selected sentence block group frame is displayed in the area 1308.

Figure 14:
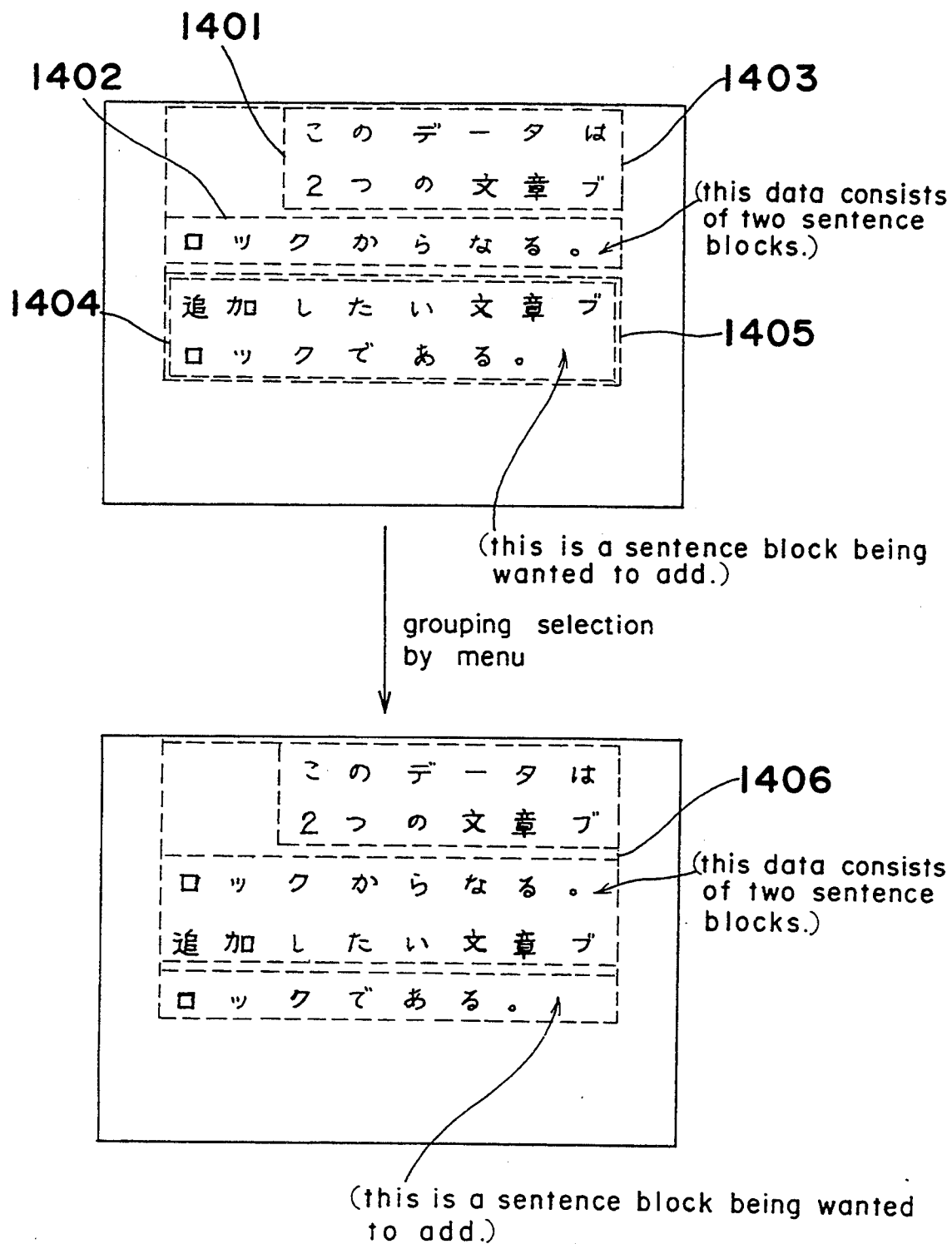
FIG. 14 is a grouping operation display frame example.

When the user instructs that displayed sentence blocks of different sentence block groups are to be combined into a same sentence block group, the grouping operation judging means 210 judges that the user specified operation is a grouping operation. When the user specified operation is judged to the grouping operation, the grouping execution mans 217 is processed. FIG. 14 is a display frame example for explaining the grouping operation. Reference numeral 1401 is a first sentence block; reference numeral 1402 is a second sentence block; reference numeral 1403 is a selected sentence block group frame surrounding the sentence blocks 1401 and 1402; reference numeral 1404 is a third sentence block; and reference numeral 1405 is another selected sentence block group frame surrounding the sentence block group which includes the sentence block 1404.

Referring also to FIG. 7, in the grouping execution means 217, the following operations are executed.

The sentence block group integrating means 706 newly forms a sentence block group in the sentence block group management means 105 all the sentence blocks to be combined, to thereby be controlled by the sentence block group management means 105 and to thereby form a frame surrounding the newly formed sentence block group. The original grouping of the sentence blocks is removed within the sentence block group management means 105. In the case of FIG. 14, a sentence block group containing sentence blocks 1401, 1402 and 1404 as elements is to formed so as to display a corresponding selected sentence block group frame in the area 1406.

Figure 15:
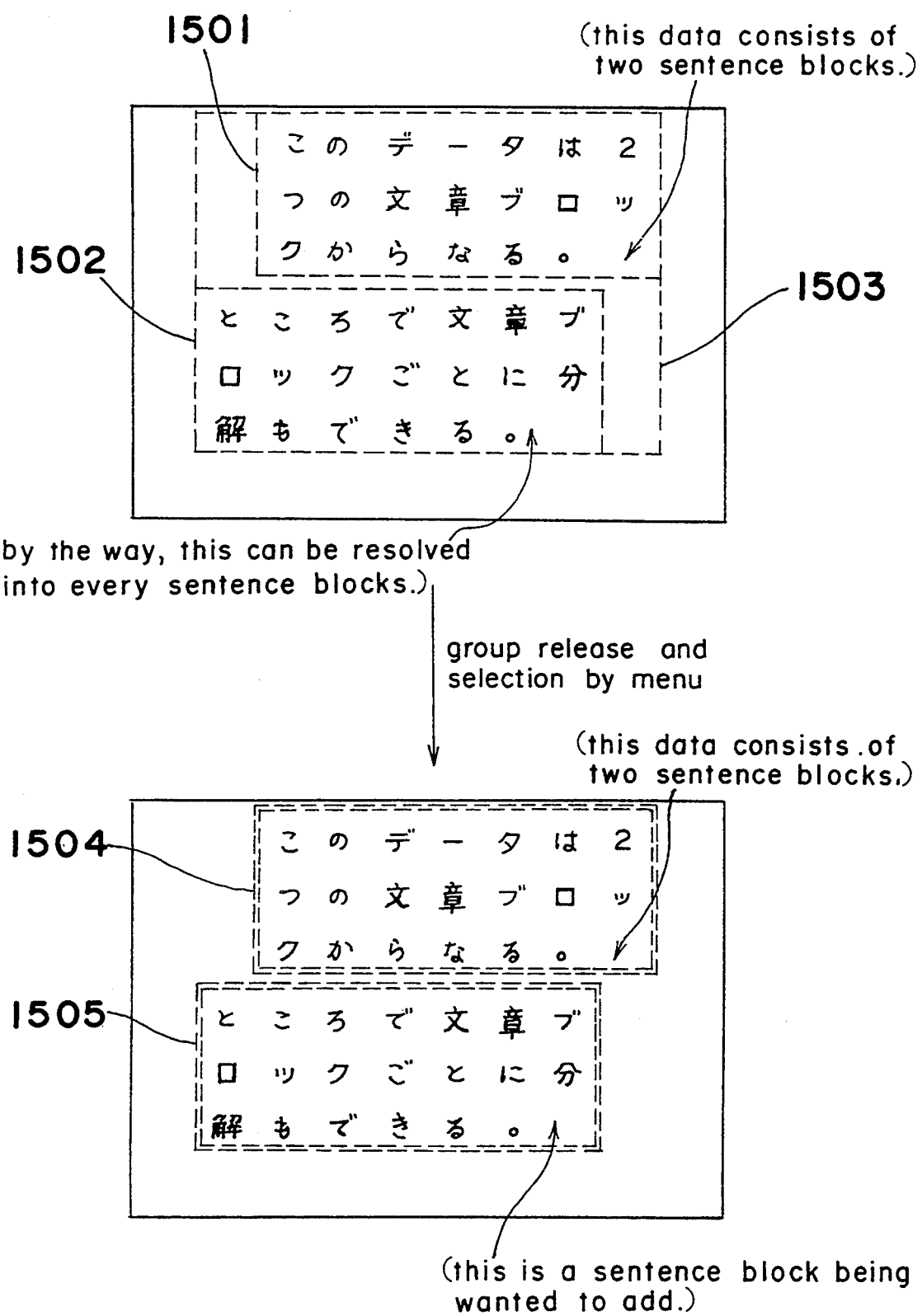
FIG. 15 is a group releasing operation display frame example.

When the user instructs that a displayed sentence block is to be released from a sentence block group, the group releasing operation judging means 211 judges that the user specified operation is a group releasing operation. When the user specified operation is judged to be the group releasing operation, the group release executing means 218 is processed. FIG. 15 is a display frame example for explaining the group releasing operation.

Reference numeral 1501 is a first sentence block; reference numeral 1502 is a second sentence block;

reference numeral 1503 is a selected sentence block group frame of the sentence block group including the blocks 1501 and 1502.

Referring also to FIG. 8, in the group release executing means 218, the following operation is executed.

The sentence block group dismantling means 806 newly forms sentence block groups in the sentence block group management means 105 each having a single sentence block contained in an original sentence block group, to thereby be controlled by the sentence block group management means 105 and to form respective sentence block group frames surrounding the newly formed sentence block groups. The releasing of the sentence blocks from the group is achieved by removing the original sentence block group in the sentence block group management means 105. In the case of FIG. 15, a sentence block group containing only the sentence block 1501 is newly formed so as to display a corresponding selected sentence block group frame in the area 1504. Further, a sentence block group containing only the sentence block 1502 is also newly formed with a selected sentence block group frame displayed in the area 1505.

Figure 16:
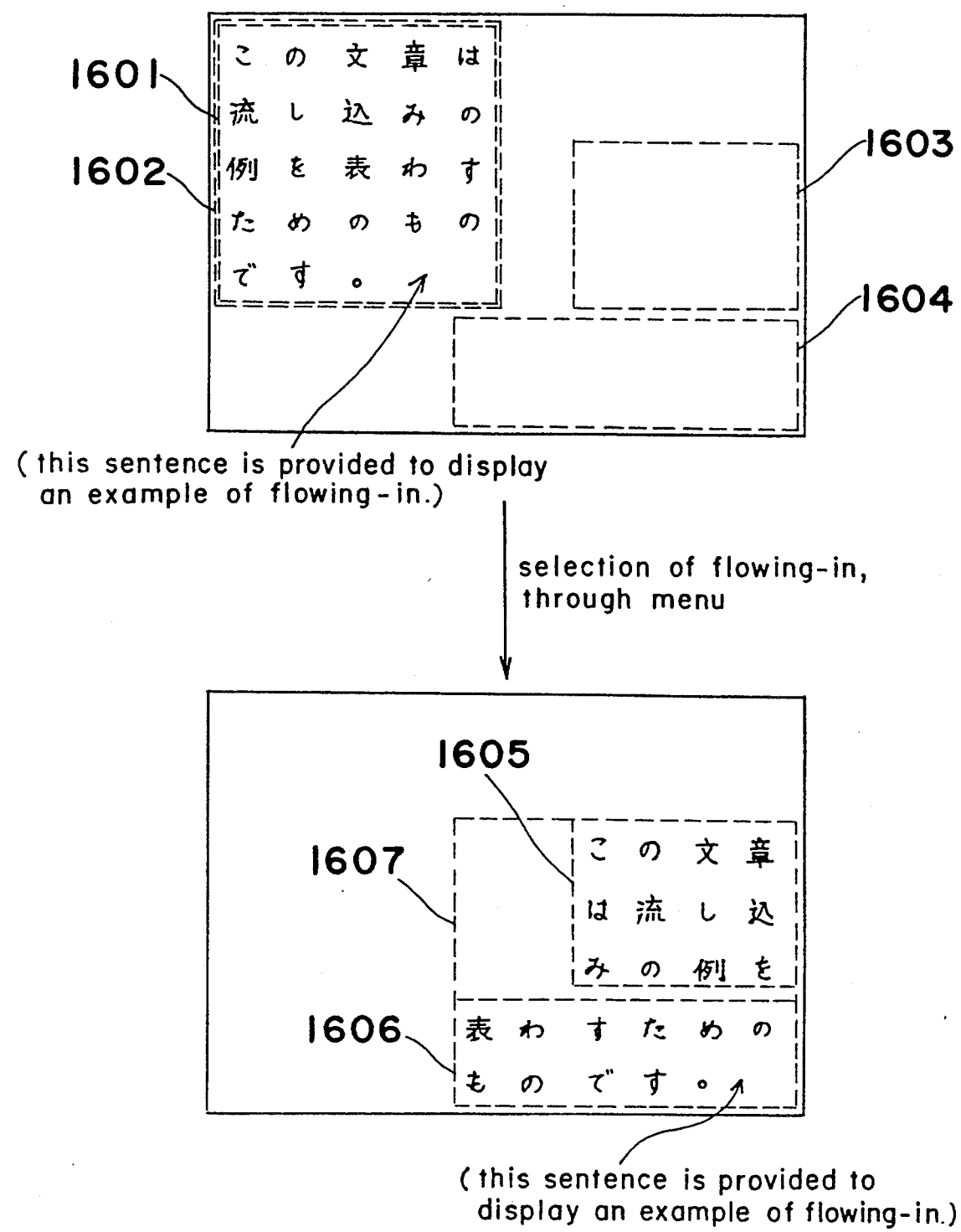
FIG. 16 is a stream-in operation display frame example.

When the user instructs that text be transferred from one block to other sentence blocks on the display frame, the sentence stream-in operation judging means 212 judges that the user specified operation is a stream-in operation. When the user specified operation is judged to a stream-in operation, the stream-in executing means 219 is processed. FIG. 16 is display frame example for explaining the stream-in operation.

Reference numeral 1601 is a sentence block; and reference numeral 1602 is a selected sentence block group frame of the sentences block group including the sentence block 1601.

Referring also to FIG. 9, in the stream-in executing means 219, the following operations are executed.

The sentence block area direct specifying means 906 recognizes a sentence block area specified by the user via the use of the direct coordinates specifying means 901. In the case of FIG. 16, reference numeral 1603 denotes a first replacement sentence block area, and reference numeral 1604 denotes a second alternate sentence block area.

The replacement sentence block forming means 907 establishes the sentence block specifying means 102, the sentence block area storing means 103, the sentence block displaying means 104 each time a sentence block is set by the sentence block area direct specifying means 906 so as to set the rectangular area specified by the sentence block area direct specifying means 900 on the newly established sentence block area storing means 103. In FIG. 16, an area 1603 is set in the display area of the new first sentence block, and an area 1604 is set in the display area of the new second sentence block.

The replacement sentence block character number computing means 908 computes the number of character codes to be included in each sentence block from the size of the sentence block rectangular area specified by the sentence block area direct specifying means 906. In the case of FIG. 16, twelve characters at maximum are to be accommodated in the area 1603, and twelve characters at maximum in the area 1604.

The character code integrating means 909 integrates a series of all the character codes specified by the sentence block specifying means 102 with respect to all the sentence blocks to be controlled by the sentence block group management means 105, with respect to all tile sentence block groups within the frame being displayed so as to write them into the sentence storing means 101. In the case of FIG. 16, the text contained in the block 1602 is written.

The replacement sentence block specification setting means 910 extracts a number of characters according to the replacement sentence block character number computing means 908 from the integrated contiguous character codes stored in the sentence storing means 101 so as to set them into the sentence block specifying means 102 newly established by the corresponding replacement sentence block newly-establishing means 907. In the case of FIG. 16, it is set that the sentence block specifying means 102 of the first replacement sentence block 1603 specifies the text shown therein from the first to the twelfth character, and it is set that the sentence block specifying means 102 of the second replacement sentence block 1604 specifies the text shown therein from the thirteenth character to the last character.

Finally, the replacement sentence block group forming means 911 newly forms in the sentence block group management means 105 a sentence block group containing the sentence blocks newly established by the replacement sentence block forming means 907 so as to realize the stream-in operation. The original sentence block group is deleted from the sentence block group management means. As a result, in FIG. 16, the replacement sentence block 1603 is displayed in the sentence block 1605, the replacement sentence block 1604 is displayed in the sentence block 1606, and the selected sentence block group frame of the sentence block group is displayed in the area 1607.

Figure 17:
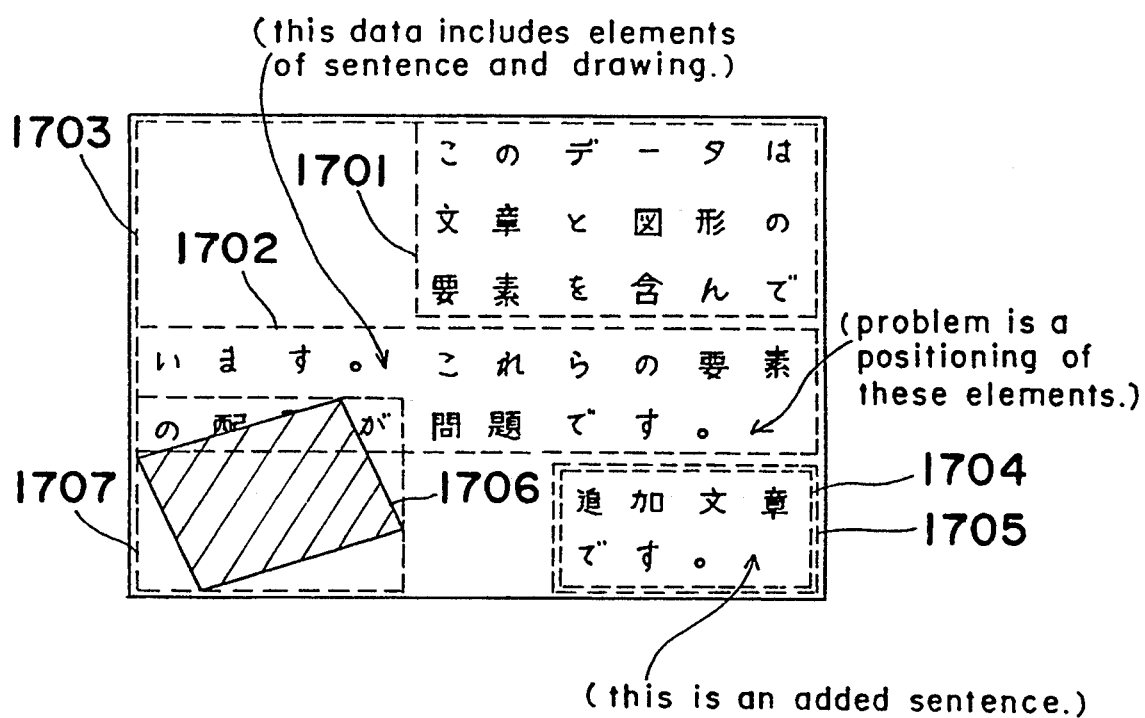
FIG. 17 is a display frame example prior to the automatic stream in operation execution.

When the user instructs that text is to be automatically transferred from among sentence blocks on the display frame, the stream-in operation judging means 212 judges that the user specified operation is an automatic stream-in operation. When the user specified operation is judged to be an automatic stream-in operation, the stream-in executing means 219 is processed. FIG. 17 is a display frame example for explaining a situation prior to effecting the automatic stream-in operation.

Figure 18:
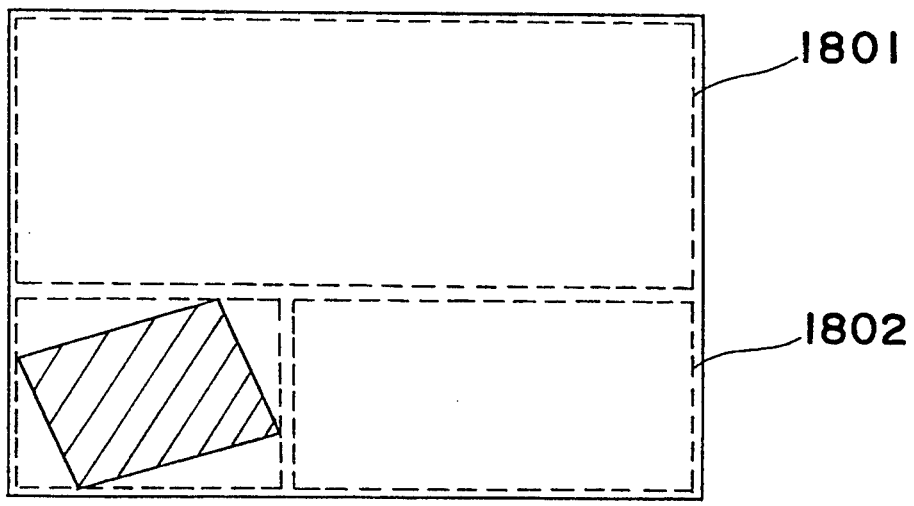
FIG. 18 is an automatic stream in area display frame example.

Reference numeral 1701 is a first sentence block; reference numeral 1702 is a second sentence block; and reference numeral 1703 is a selected sentence block group frame of the sentence block group including the sentence blocks 1701 and 1702. Reference numeral 1704 is a third sentence block; reference numeral 1705 is a frame of the sentence block group including the sentence block 1704; reference numeral 1706 is a figure element displayed on the display frame; and reference numeral 1707 is a frame surrounding the figure element. Referring also to FIGS. 9 and 18, in the stream-in executing means 219, the following operations are executed.

The sentence block area automatic specifying means 912 automatically specifies a rectangular area, as the sentence block, on the display frame. FIG. 18 is a display frame example showing the replacement sentence blocks set by the sentence block area automatic specifying means 912. The sentence block area automatic specifying means 912 in the condition of FIG. 17 automatically sets, as the replacement sentence blocks, rectangular areas not overlapping the figure area, namely, the areas 1801 and 1802 on the display frame.

Each time the replacement sentence block forming means 907 sets a sentence block by the sentence block area direction specifying means 906, the sentence block specifying means 102, the sentence block area storing means 103, the sentence block displaying means 104 are newly established, and a rectangular area established by the sentence block area direct specifying means 906 on the newly established sentence block is stored in storing means 103. In FIG. 18, the area 1801 is set in the display area of the new first sentence block, and the area 1802 is set in the display area of the second sentence block.

The replacement sentence block character number computing means 908 computes the number of character codes included in each block from the size of the sentence block rectangular area specified by the sentence block area direct specifying means 906. In the case of FIG. 18, the computing operation is effected when forty characters at maximum can enter the area 1801, and eighteen characters in maximum enter the area 1802.

The character code integrating means 909 integrates a series of all the character codes specified by the sentence block specifying means 102 with respect to all the sentence blocks so as to write them into the sentence storing means 101. All the sentence blocks are controlled by the sentence block group management means 105 with respect to all the sentence block groups within the selection frame being displayed. In the case of FIG. 17, the depicted characters are integrated and stored.

The replacement sentence block specification setting means 910 extracts a number of characters according to the replacement sentence block character number computing means 908 from the stored integrated character codes so as to set them into the sentence block specifying means 102 newly formed by the corresponding replacement sentence block forming means 907. In the case of FIG. 17 and FIG. 18, the sentence block specifying means 102 of the first replacement sentence block 1801 is set to specify the first to the fortieth characters. The sentence block specifying means 102 of the second replacement sentence block 1802 is set to specify the forty-first character to the last character.

Figure 19:
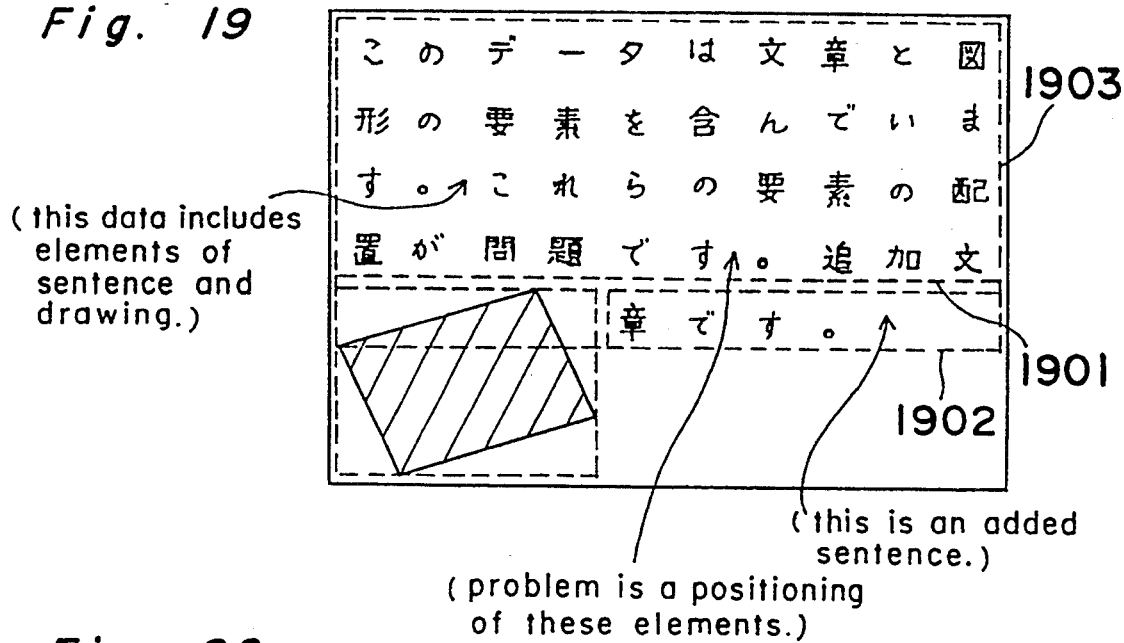
FIG. 19 is an automatic stream in operation display frame.
Figure 20:
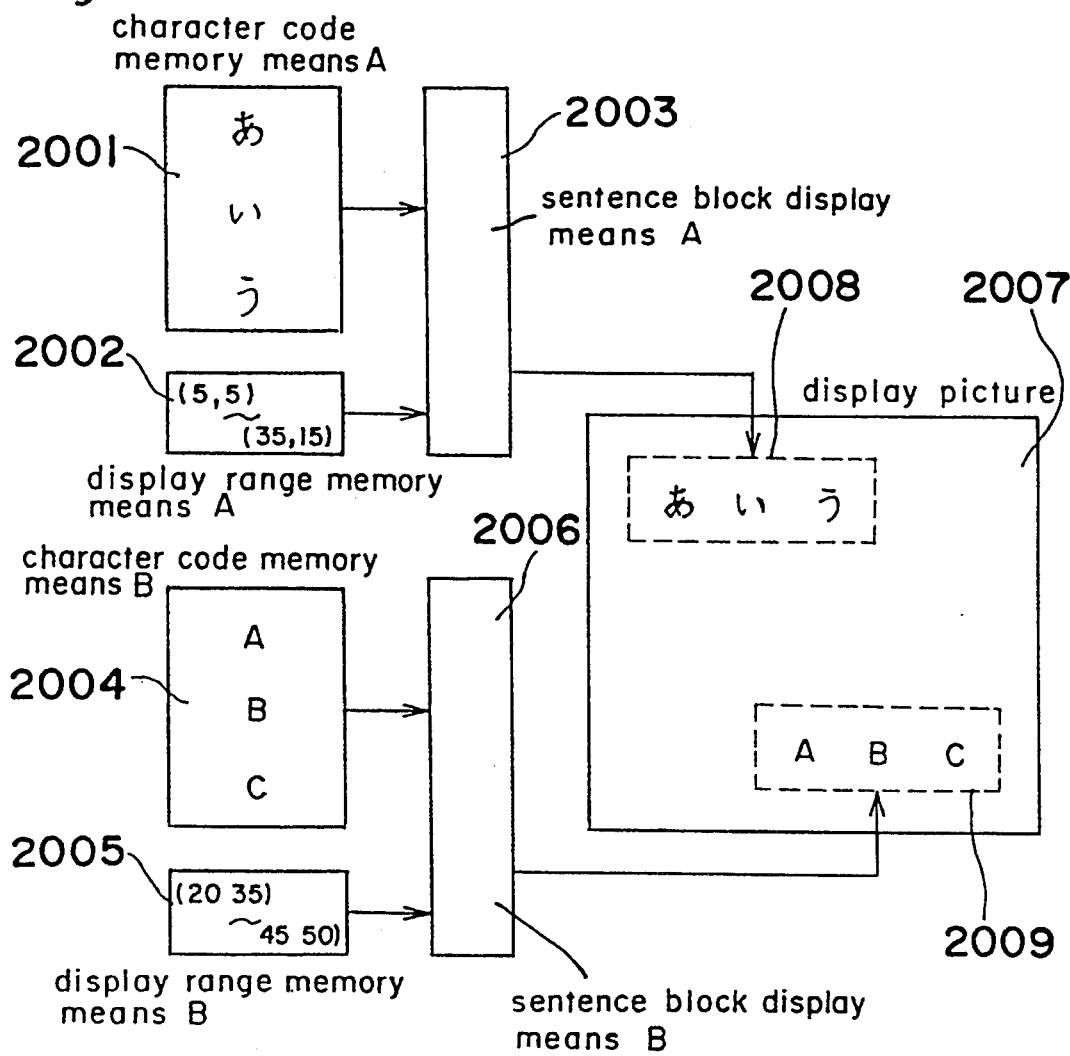
FIG. 20 is a block diagram of the conventional document processing apparatus (sentence block system)
Figure 21:
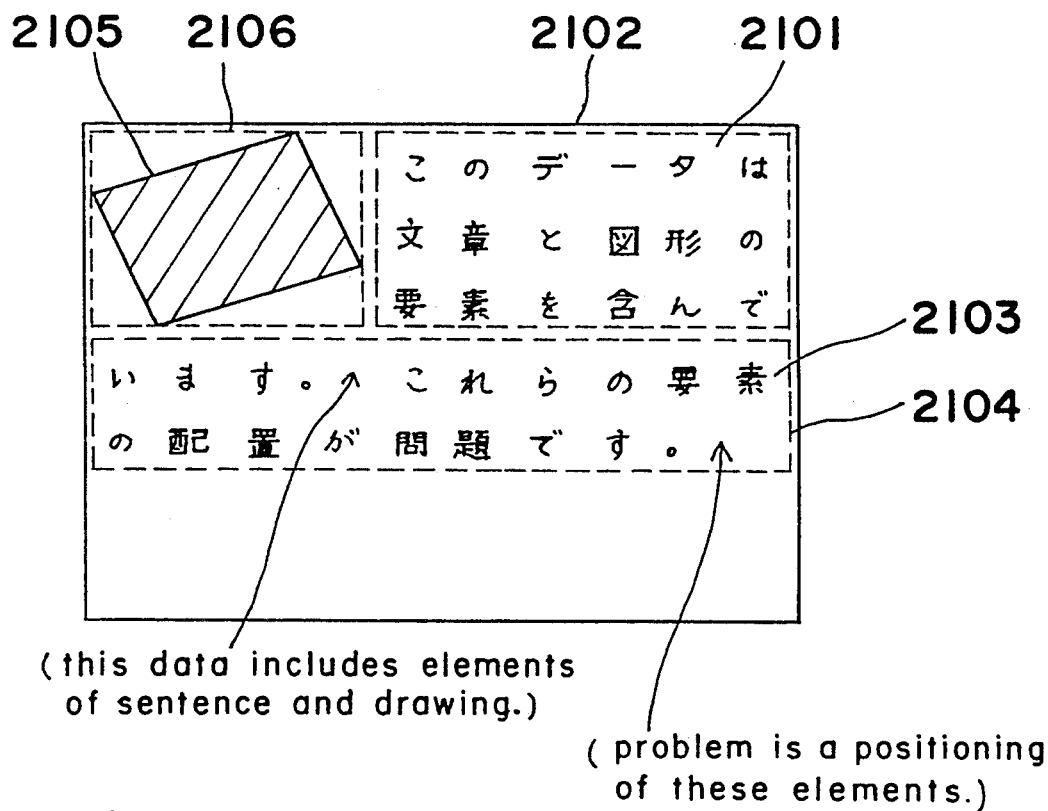
FIG. 21 is a display frame example by the conventional document processing apparatus (sentence block system)
Figure 22:
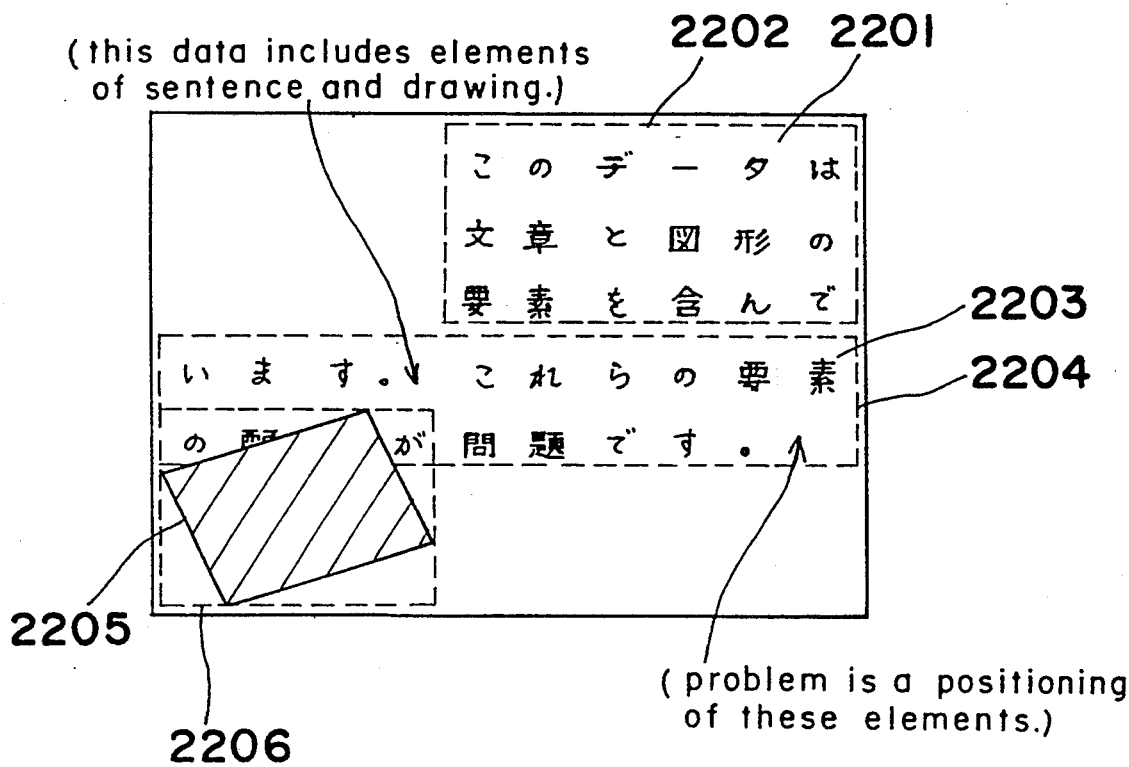
FIG. 22 is a display frame example after the figure movement by the conventional document processing apparatus (sentence stream system)
Figure 23:
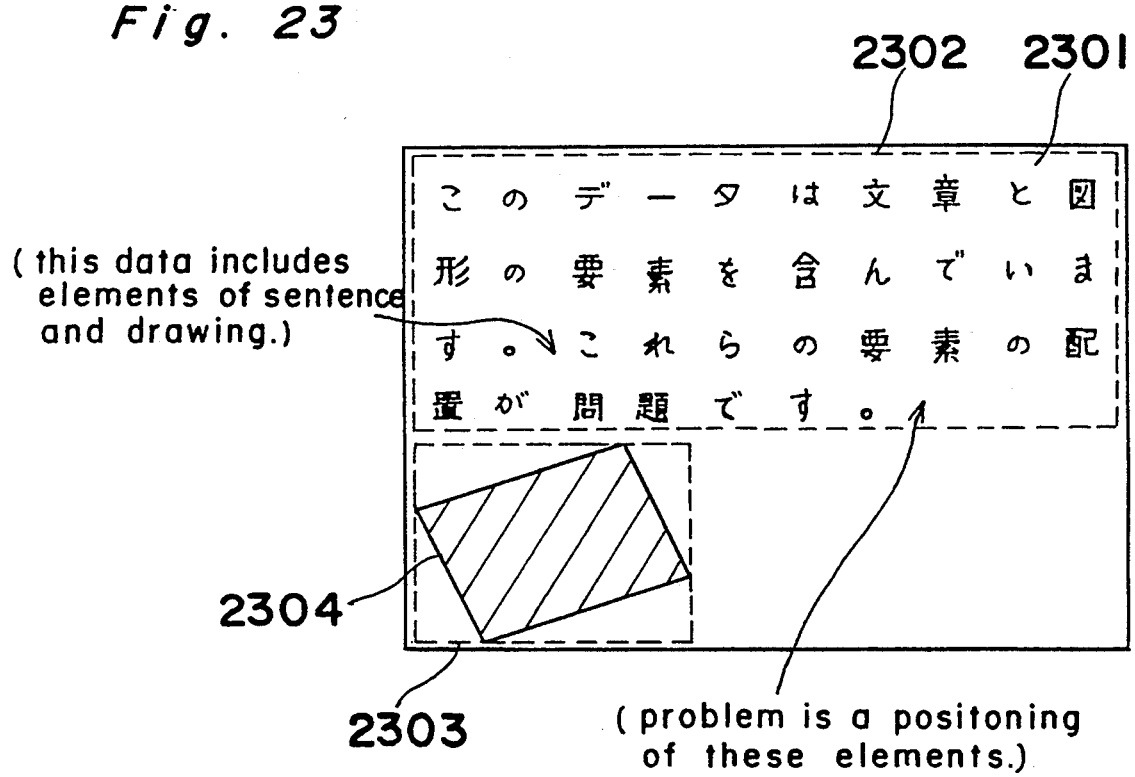
FIG. 23 is an ideal result display frame example after the figure movement.
Figure 25:
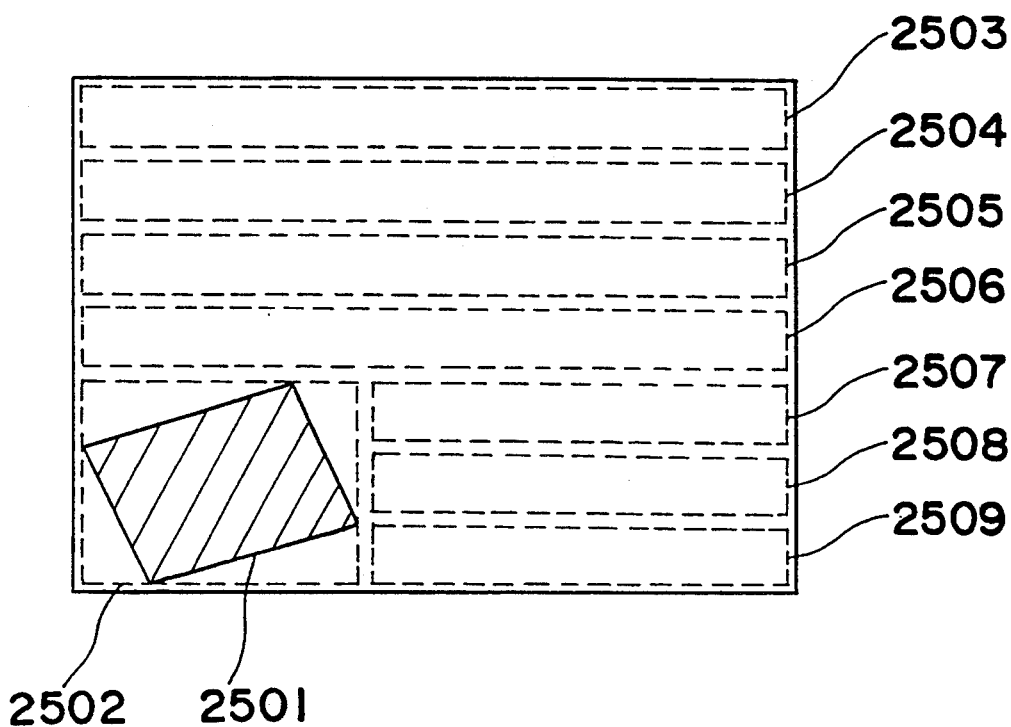
FIG. 25 is a line area view of the conventional document processing apparatus (sentence stream system)
Figure 24:
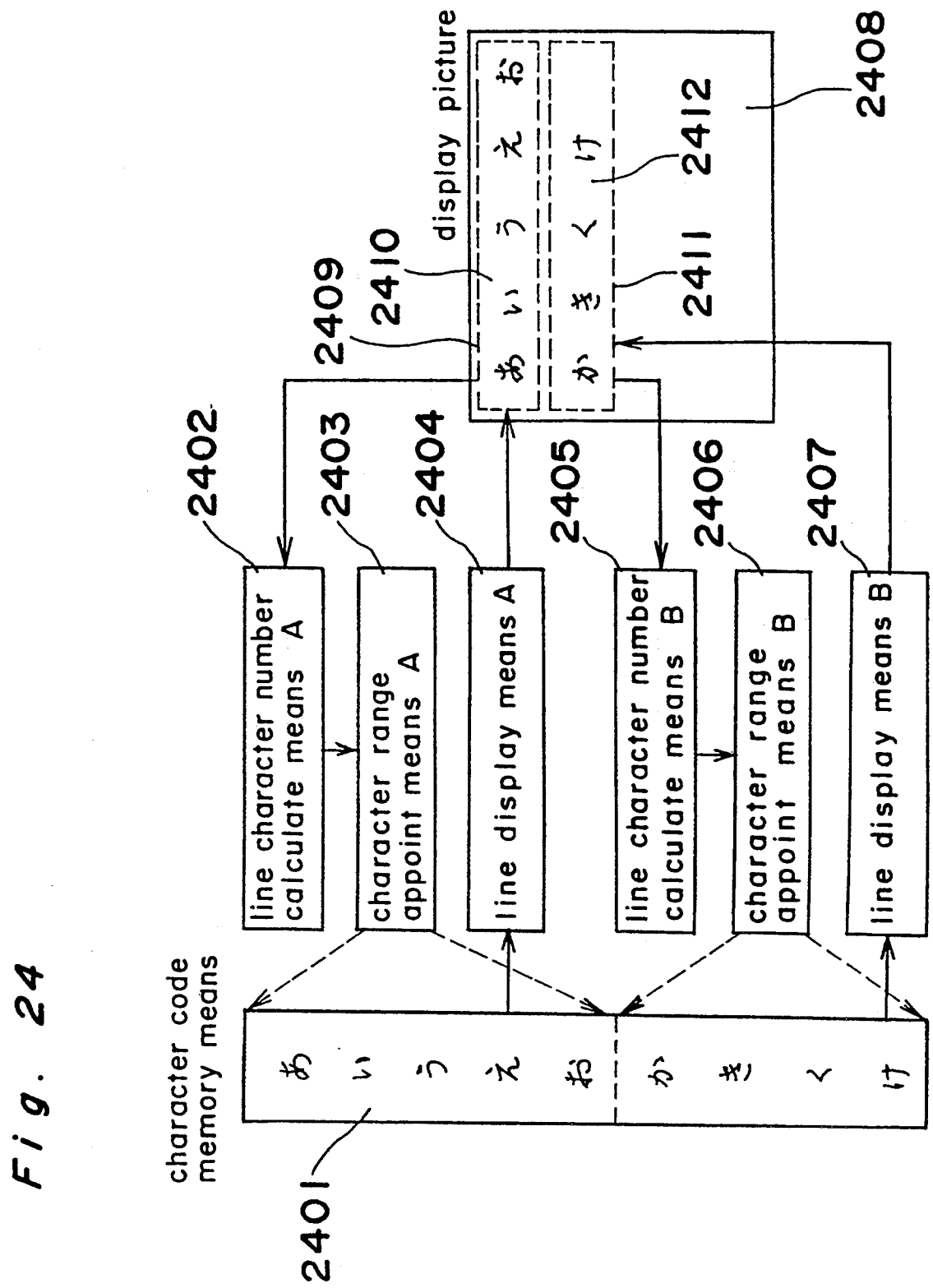
FIG. 24 is a block diagram of the conventional document processing apparatus (sentence stream system)
Figure 26:
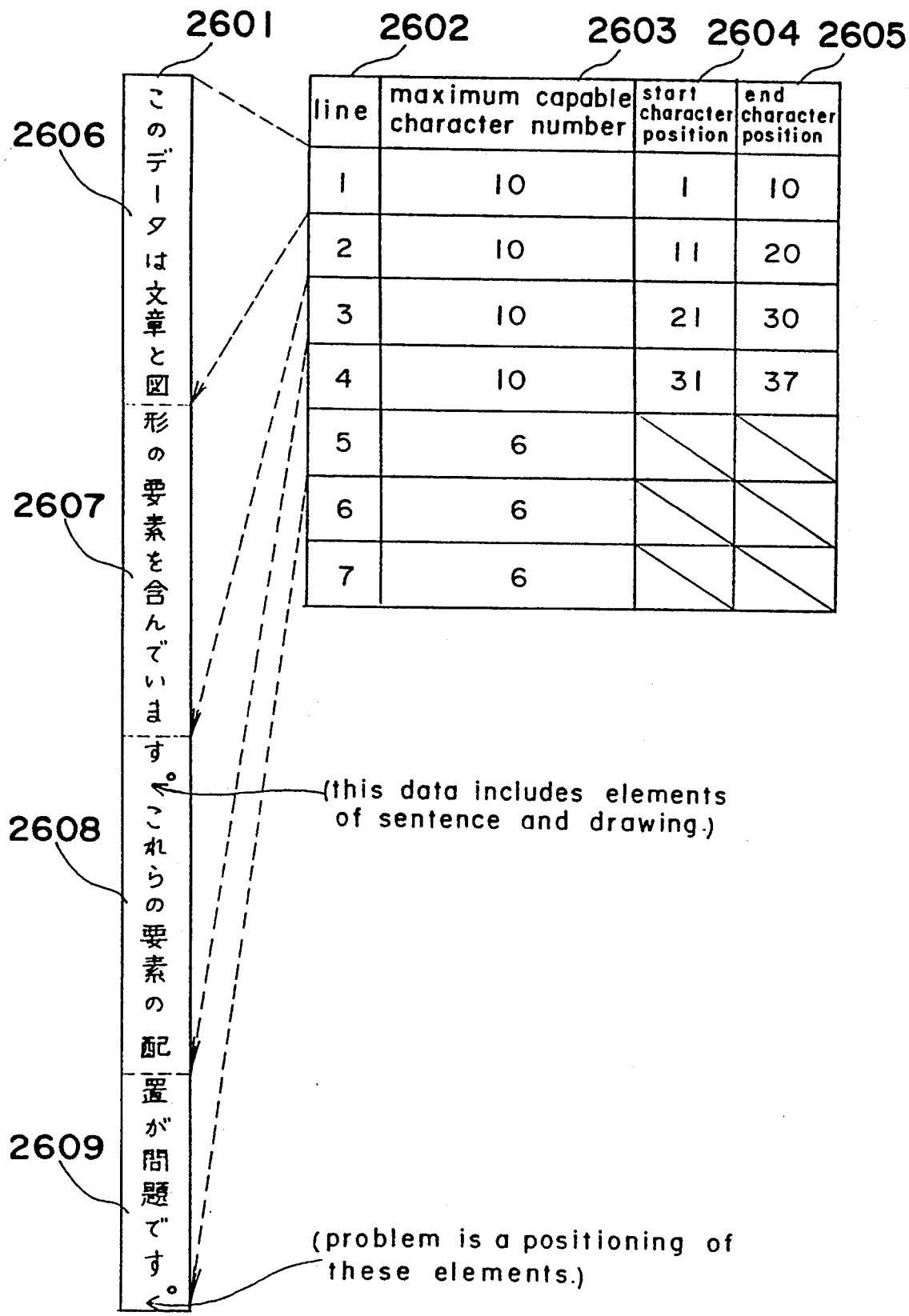
FIG. 26 is an operation model view of the conventional document processing apparatus (sentence stream system)
Figure 27:
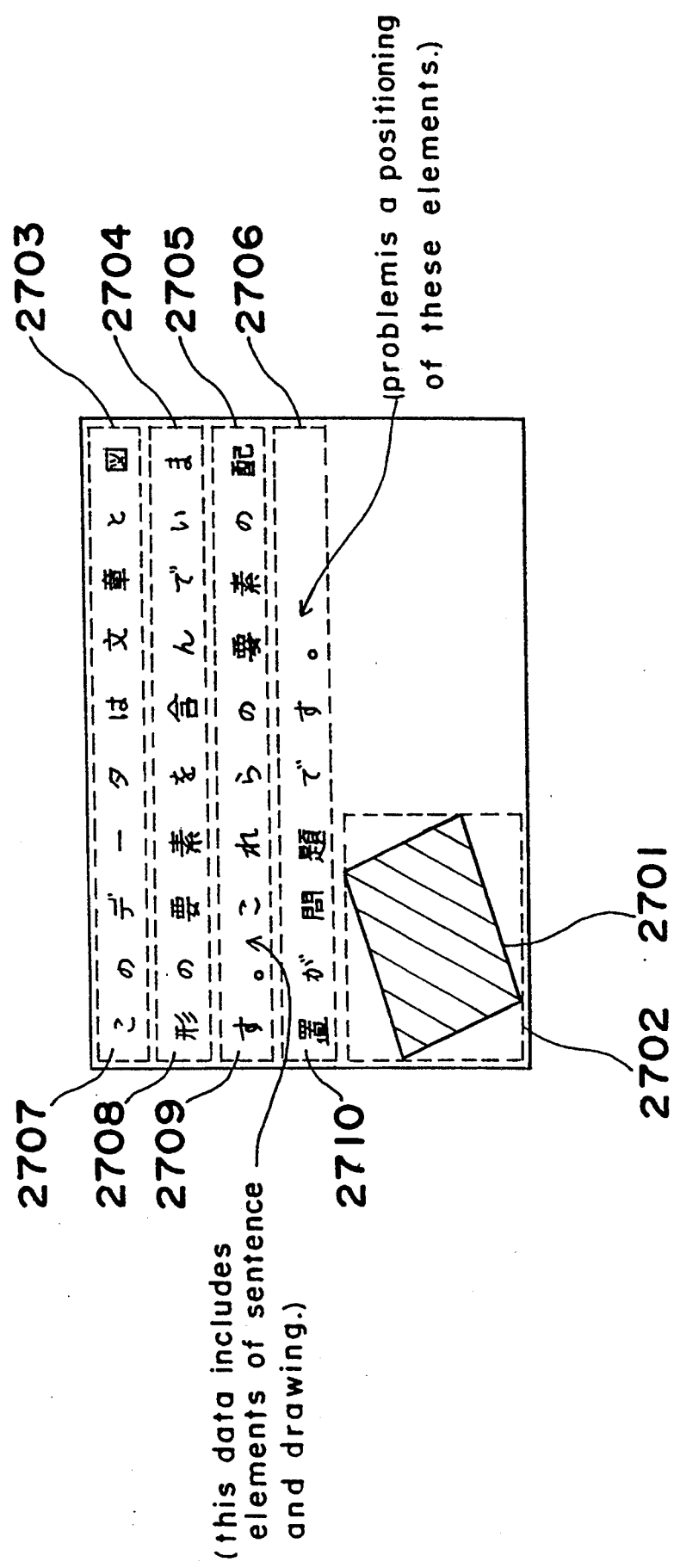
FIG. 27 is a display frame example after the figure movement by the conventional document processing apparatus (sentence stream system)
Figure 28:
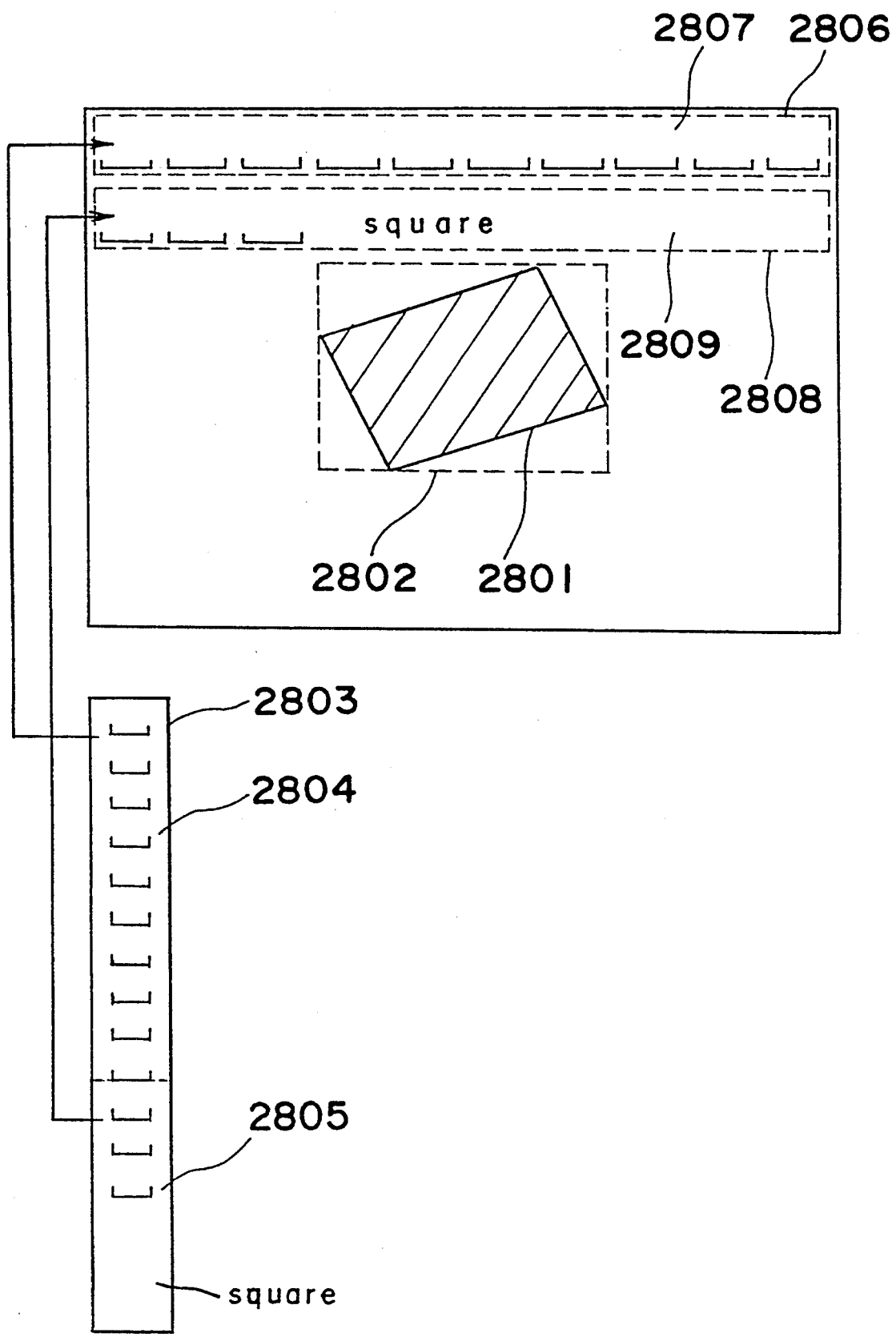
FIG. 28 is a model view of a figure attached sentence display by the conventional document processing apparatus (sentence stream system).

Finally, the replacement sentence block group newly-establishing means 911 newly establishes the sentence block group management means 105 having all the sentence blocks, as elements, newly established by the replacement sentence block forming means 907 so as to realize the automatic stream-in operation of the sentence by the removing of all the original sentence block groups management means. As the results, the replacement sentence block 1801 and 1802 respectively become the sentence blocks 1901, and 1902 of FIG. 19, with the frame of the sentence block group displayed in the area 1903.

According to the present invention as described hereinabove, the text of such sentences is automatically integrated when a figure and the text are superimposed, thus making it possible to set a new text area in a display area other than a display area of the figure, and to move text to be accompanied by the figure as the comment, so that selection, shifting, copying, modifying, grouping, and group releasing of the sentence blocks may be effected.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A document processing apparatus for controlling the display of text on a display frame of a display device, said apparatus comprising:

coordinate input means for inputting user instructions including display coordinates of the display frame as specified by a user;

text block group control means for controlling a grouping of text to be displayed on said display frame, said text block group control means including (1) memory means for storing a plurality of text characters, (2) block area coordinates storing means for storing information indicative of coordinates of a plurality of rectangular display areas of the display frame each constituting a text block area, (3) text block specifying means for specifying text characters from among the plurality of text characters, the text characters specified by said text block specifying means for display in each of the plurality of rectangular display areas stored in said block area coordinates storing means, (4) text block display means for controlling the display of the text block areas stored in said block area coordinates storing means containing the text characters specified by said text block specifying means, and (5) text block group management means for designating a text block group containing one or more text block areas to be displayed by said text block display means; and display control means for receiving the user instructions from said coordinate input means and for controlling said text block group control means in accordance with the user instructions, said display control means including (1) specified text block detecting means for detecting which one of a plurality of displayed text block areas has been specified by the user based on the display coordinates of said coordinate input means, (2) specified text block group detecting means for detecting a displayed text block group containing the one of the plurality of displayed text block areas detected by said specified text block detecting means, and (3) stream-in operation means for transferring, responsive to a corresponding user instruction via said coordinate input means, text characters from one text block group detected by said specified text block group detecting means to another defined text block group;

wherein said stream-in operation means includes (1) a text block area direct specifying means for directly specifying a rectangular display area of a new text block area according to said coordinates input means, (2) a replacement text block forming means for forming the new text block area specified by said text block area direct specifying means, (3) a replacement text block character number computing means for computing a number of text characters to be included in the new text block area according to a size of the new text block area, (4) a character integrating means for integrating all of the text characters specified by a corresponding sentence block specifying means so as to write the text characters as one continuous text into said text character storing means, (5) a replacement text block specification setting means for extracting a number of characters computed by said text block character number computing means from among the continuous text so as to set the extracted characters into the text block area newly formed by said replacement text block forming means, and (6) a replacement block group forming means for forming a replacement block group containing at least one newly formed block group area.

2. A document processing apparatus as claimed in claim 1, wherein said display control means includes means for controlling a selection of text block areas to be displayed, a shifting of each text block group from one display location to another display location, a copying of a displayed text block group at another display location, a modification of a configuration of a displayed text block group, a grouping of text block areas to be contained in each text block group, and a releasing of blocks from a text block group for display.

3. A document processing apparatus as claimed in claim 1, wherein said display control means includes selection operation means for selecting, responsive to a corresponding user instruction via said coordinate input means, from among displayed text block areas to be included in the displayed text block group detected by said specified text block group detecting means.

4. A document processing apparatus as claimed in claim 3, wherein said selection operation means includes means for displaying a polygonal frame surrounding a displayed text block group containing a plurality of selected text block areas.

5. A document processing apparatus as claimed in claim 1, wherein said display control means includes shifting operation means for shifting, responsive to a corresponding user instruction via said coordinate input means, a displayed text block group containing a plurality of text block areas from one display location to another display location on said display frame.

6. A document processing apparatus as claimed in claim 5, wherein said shifting operating means includes (1) means for computing a coordinate difference between an original location of the displayed text block group and a target location of the displayed text block group, and (2) means for adding the coordinate difference to each of the text block areas of the text block group stored in the block area storing means to thereby shift the location of the displayed text block group containing the text block areas.

7. A document processing apparatus as claimed in claim 1, wherein said display control means includes copy operation means for copying, responsive to a corresponding user instruction via said coordinate input means, a displayed text block group containing a plurality of text block areas from one display location at another display location on said display frame.

8. A document processing apparatus as claimed in claim 7, wherein said copy operation means includes (1) means for computing a coordinate difference between a location of the original displayed text block group and a target location of the copied displayed text block group, (2) character code copy means for copying the text characters contained in each of the text block areas of the displayed text block group to be copied, (3) text block specifying means for specifying text characters from among the copied text characters which are for display in the text block areas of the text block group to be copied at the other display location, (4) text block forming means for forming the new text block areas of the text block group to be copied by adding the coordinated difference to the text block areas which form the original displayed text block group, and (5) text block group forming means for forming a new text block group containing the new text block areas.

9. A document processing apparatus as claimed in claim 1, wherein said display control means includes modifying operation means for modifying, responsive to a corresponding user instruction via said coordinate input means, a configuration of the detected displayed text block area.

10. A document processing apparatus as claimed in claim 9, wherein said modify operation means includes means for substituting the modified displayed text block area in place of the original detected displayed text block area in said block area storing means.

11. A document processing apparatus as claimed in claim 1, wherein said display control means includes grouping operation means for grouping, responsive to a corresponding user instruction via said coordinate input means, a plurality of user specified text block areas contained in original text block groups into a specified new text block group to be stored in said group block management means.

12. A document processing apparatus as claimed in claim 11, wherein said grouping operation means includes means for combining the text block areas of two different original text block groups into a single text block group containing the text block areas of the two different original text block groups.

13. A document processing apparatus as claimed in claim 1, wherein said display control means includes group release operation means for releasing, responsive to a corresponding user instruction via said coordinate input means, a plurality of user specified text block areas contained in an original text block group from the original text block group.

14. A document processing apparatus as claimed in claim 13, wherein said group release operation means includes means for forming plural text block groups to be stored in said text block group management means each containing a single one of said plurality of user specified text block areas of the original text block group.

15. A document processing apparatus for controlling the display of text on a display frame of a display device, said apparatus comprising:

coordinate input means for inputting user instructions including display coordinates of the display frame as specified by a user;

text block group control means for controlling a grouping of text to be displayed on said display frame, said text block group control means including (1) memory means for storing a plurality of text characters, (2) block area coordinates storing means for storing information indicative of coordinates of a plurality of rectangular display areas of the display frame each constituting a text block area, (3) text block specifying means for specifying text characters from among the plurality of text characters, the text characters specified by said text block specifying means for display in each of the plurality of rectangular display areas stored in said block area coordinates storing means, (4) text block display means for controlling the display of the text block areas stored in said block area storing means containing the text characters specified by said text block specifying means, and (5) text block group management means for designating a text block group containing one or more text block areas to be displayed by said text block display means; and display control means for receiving the user instructions from said coordinate input means and for controlling said text block group control means in accordance with the user instructions, said display control means including (1) specified text block detecting means for detecting which one of a plurality of displayed text block areas has been specified by the user based on the display coordinates of said coordinate input means, (2) specified text block group detecting means for detecting a displayed text block group containing the one of the plurality of displayed text block areas detected by said specified text block detecting means, and (3) stream-in operation means for automatically transferring, responsive to a corresponding user instruction via said coordinate input means, text characters from one text block group detected by said specified text block group detecting means as being superimposed on a displayed figure within the display frame to another defined text block group which is not superimposed on the displayed figure within the display frame;

wherein said stream-in operation means includes (1) a text block area direct specifying means for automatically specifying a rectangular display area of a new text block area which does not overlap any displayed figure, (2) a replacement text block forming means for forming the new text block area specified by said text block area direct specifying means, (3) a replacement text block character number computing means for computing a number of text characters to be included in the new text block area according to a size of the new text block area, (4) a character integrating means for integrating all of the text characters specified by a corresponding sentence block specifying means so as to write the text characters as one continuous text into said text character storing means, (5) a replacement text block specification setting means for extracting a number of characters computed by said text block character number computing means from among the continuous text so as to set the extracted characters into the text block area newly formed by said replacement text block forming means, and (6) a replacement block group forming means for forming a replacement block group containing at least one newly formed block group area.

16. A document processing apparatus as claimed in claim 15, wherein said display control means includes means for controlling a selection of text block areas to be displayed, a shifting of each text block group from one display location to another display location, a copying of a displayed text block group at another display location, a modification of a configuration of a displayed text block group, a grouping of text block areas to be contained in each text block group, and a releasing of blocks from a text block group for display.

17. A document processing apparatus as claimed in claim 15, wherein said display control means includes selection operation means for selecting, responsive to a corresponding user instruction via said coordinate input means, from among displayed text block areas to be included in the displayed text block group detected by said specified text block group detecting means.

18. A document processing apparatus as claimed in claim 17, wherein said selection operation means includes means for displaying a polygonal frame surrounding a displayed text block group containing a plurality of selected text block areas.

19. A document processing apparatus as claimed in claim 15, wherein said display control means includes shifting operation means for shifting, responsive to a corresponding user instruction via said coordinate input means, a displayed text block group containing a plurality of text block areas from one display location to another display location on said display frame.

20. A document processing apparatus as claimed in claim 19, wherein said shifting operation means includes (1) means for computing a coordinate difference between an original location of the displayed text block group and a target location of the displayed text block group, and (2) means for adding the coordinate difference to each of the text block areas of the text block group stored in the block area storing means to thereby shift the location of the displayed text block group containing the text block areas.

21. A document processing apparatus as claimed in claim 15, wherein said display control means includes copy operation means for copying, responsive to a corresponding user instruction via said coordinate input means, a displayed text block group containing a plurality of text block areas from one display location at another display location on said display frame.

22. A document processing apparatus as claimed in claim 21, wherein said copy operation means includes (1) means for computing a coordinate difference between a location of the original displayed text block group and a target location of the copied displayed text block group, (2) character code copy means for copying the text characters contained in each of the text block areas of the displayed text block group to be copied, (3) text block specifying means for specifying text characters from among the copied text characters which are for display in the text block areas of the text block group to be copied at the other display location, (4) text block forming means for forming the next text block areas of the text block group to be copied by adding the coordinated difference to the text block areas which form the original displayed text block group, and (5) text block group forming means for forming a new text block group containing the new text block areas.

23. A document processing apparatus as claimed in claim 15, wherein said display control means includes modify operation means for modifying, responsive to a corresponding user instruction via said coordinate input means, a configuration of the detected displayed text block area.

24. A document processing apparatus as claimed in claim 23, wherein said modify operation means includes means for substituting the modified displayed text block area in place of the original detected displayed text block area in said block area storing means.

25. A document processing apparatus as claimed in claim 15, wherein said display control means includes grouping operation means for grouping, responsive to a corresponding user instruction via said coordinate input means, a plurality of user specified text block areas contained in original text block groups into a specified new text block group to be stored in said group block management means.

26. A document processing apparatus as claimed in claim 25, wherein said grouping operation means includes means for combining the text block areas of two different original text block groups into a single text block group containing the text block areas of the two different original text block groups.

27. A document processing apparatus as claimed in claim 15, wherein said display control means includes group release operation means for releasing, responsive to a corresponding user instruction via said coordinate input means, a plurality of user specified text block areas contained in an original text block group from the original text block group.

28. A document processing apparatus as claimed in claim 27, wherein said group release operation means includes means for forming plural text block groups to be stored in said text block group management means each containing a single one of said plurality of user specified text block areas of the original text block group.

* * * * *